(12) United States Patent
Gordon

(10) Patent No.: US 10,068,134 B2
(45) Date of Patent: Sep. 4, 2018

(54) IDENTIFICATION OF OBJECTS IN A SCENE USING GAZE TRACKING TECHNIQUES

(71) Applicant: Microsoft Technology Licensing, LLC, Redmond, WA (US)

(72) Inventor: John C. Gordon, Newcastle, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 136 days.

(21) Appl. No.: 15/145,568

(22) Filed: May 3, 2016

(65) Prior Publication Data
US 2017/0323158 A1 Nov. 9, 2017

(51) Int. Cl.
*G06K 9/00* (2006.01)
*G06F 3/01* (2006.01)
*G06F 17/30* (2006.01)
*G06K 9/20* (2006.01)
*G06K 9/62* (2006.01)
*G06T 7/00* (2017.01)
*G06Q 10/10* (2012.01)
*G06Q 30/00* (2012.01)

(52) U.S. Cl.
CPC ......... *G06K 9/00671* (2013.01); *G06F 3/013* (2013.01); *G06F 17/30* (2013.01); *G06F 17/3053* (2013.01); *G06F 17/30247* (2013.01); *G06F 17/30265* (2013.01); *G06F 17/30268* (2013.01); *G06K 9/20* (2013.01); *G06K 9/6215* (2013.01); *G06Q 10/101* (2013.01); *G06Q 30/00* (2013.01); *G06T 7/0044* (2013.01)

(58) Field of Classification Search
CPC ....... G06K 9/00671; G06T 7/70; G06F 3/013; G06F 17/30247; G06F 17/30265; G06F 17/30268; G06F 17/30274; G06Q 10/101
See application file for complete search history.

(56) References Cited

U.S. PATENT DOCUMENTS 9,489,401 B1\* 11/2016 Garcia et al. ..... G06F 17/30256
2008/0091512 A1 4/2008 Marci et al. .................... 705/10
(Continued)

FOREIGN PATENT DOCUMENTS

WO 20150140106 A1 9/2015

OTHER PUBLICATIONS

PCT/US2017/023924, International Search Report and Written Opinion, dated Jul. 7, 2017, 22 pages.
(Continued)

*Primary Examiner* — Andrew W Johns
(74) *Attorney, Agent, or Firm* — Newport IP, LLC; Jacob P. Rohwer

(57) ABSTRACT

Techniques and systems for identifying objects using gaze tracking techniques are described. A computing system may determine or infer that an individual is requesting to identify an object that is unknown to the individual based at least partly on images of the individual, images of a scene including the object, or both. In some cases, images of the individual may be used to determine a gaze path of the individual and the unknown object may be within the gaze path of the individual. Additionally, a computing system may send a request to identify the object to at least one individual. One or more of the responses received from the at least one individual may be provided in order to identify the object.

19 Claims, 17 Drawing Sheets

(56) References Cited

U.S. PATENT DOCUMENTS

| | | | |
|---|---|---|---|
| 2010/0010366 A1 | 1/2010 | Silberstein | 600/544 |
| 2010/0046842 A1 | 2/2010 | Conwell | 382/218 |
| 2012/0191542 A1 | 7/2012 | Nurmi | 705/14.54 |
| 2013/0136316 A1 | 5/2013 | Grassel et al. | 382/115 |
| 2014/0046922 A1 | 2/2014 | Crook et al. | 707/706 |
| 2015/0070470 A1 | 3/2015 | McMurrough | G06F 3/013 |
| 2015/0074206 A1 | 3/2015 | Baldwin | H04L 51/10 |
| 2015/0102981 A1 | 4/2015 | Lee et al. | G06F 3/013 |

OTHER PUBLICATIONS

Russakovsky, Olga, et al., "Best of Both Worlds", 2015 IEEE Conference on Computer Vision and Pattern Recognition, Jun. 7, 2015, 11 pages.

Anonymous: "Amazon Mechanical Turk—Wikipedia", Mar. 13, 2016, 12 pages.

Jangraw, et al., "Feature selection for gaze, pupillary, and EEG signals evoked in a 3D environment", In Proceedings of the 6th workshop on Eye gaze in intelligent human machine interaction: gaze in multimodal interaction, Dec. 13, 2013, pp. 45-50.

Kamienkowski, et al., "Fixation-related Potentials in Visual Search: A Combined EEG and Eye Tracking Study", In Journal of Vision, vol. 12, Issue 4, Jul. 2012, 36 pages.

Kaunitz, et al., "Looking for a Face in the Crowd: Fixation-related Potentials in an Eye-Movement Visual Search Task", In Journal of NeuroImage, vol. 89, Apr. 1, 2014, pp. 297-305.

Lasecki, et al., "Answering Visual Questions with Conversational Crowd Assistants", In Proceedings of the 15th International ACM SIGACCESS Conference on Computers and Accessibility, Oct. 21, 2013, pp. 1-8.

Latanov, et al., "EEG and EYE Tracking for Visual Search Task Investigation in Humans", In International Journal of Psychophysiology, vol. 69, Issue 3, Sep. 2008, 2 pages.

Miner, et al., "Answering Questions with an Electroencephalogram-based Brain-Computer Interface", In Archives of Physical Medicine and Rehabilitation, vol. 79, Issue 9, Sep. 1998, pp. 1029-1033.

Renold, et al., "EEG Correlates of Active Visual Search during Simulated Driving: An Exploratory Study", In Proceedings of IEEE International Conference on Systems, Man and Cybernetics, Oct. 5, 2014, 6 pages.

Winslow, et al., "Combining EEG and Eye Tracking: Using Fixation-Locked Potentials in Visual Search", In Journal of Eye Movement Research, Nov. 28, 2013, pp. 1-11.

Wolpaw, et al., "Brain-Computer Interfaces for Communication and Control", IJournal of Clinical Neurophysiology, vol. 113, Issue 6, Jun. 2002, pp. 767-791.

* cited by examiner

IDENTIFICATION OF OBJECTS IN A SCENE USING GAZE TRACKING TECHNIQUES

BACKGROUND

Throughout life, individuals encounter situations where they come across objects that are not familiar to them. In some cases, a child may find an object that they are not familiar with in their home or at school. In other cases, adults may encounter objects that are associated with an unfamiliar environment or an unfamiliar technology. It may be problematic and time consuming to formulate requests to identify objects when an individual does not know what the object is or what the object is called. Additionally, it may be difficult to identify sources of information for unknown objects and to obtain accurate information related to unknown objects.

SUMMARY

Techniques and systems for identifying objects in a scene using gaze tracking techniques are described. In particular, gaze of an individual may be determined and a position of an object in a scene may also be determined. Based on the position of the object within a scene, a computing device may determine that the object is within a field of view of the gaze of the individual. The computing device may also analyze input data to determine that the individual is requesting for the object to be identified. For example, the input data may include words, sounds, gestures, physiological data, or combinations thereof, that may be analyzed to determine that an individual is requesting for an object to be identified. In some implementations, the words, sounds, gestures, physiological data, or combinations thereof may be analyzed to infer that the individual is requesting the identification of the object.

After a computing device determines that an individual is requesting the identification of an object, the system may check to determine if the object is included in a database that includes information about a number of objects. In situations that an object is absent from the database, one or more individuals may be identified that a computing device may query to identify an unknown object. In some cases, the one or more individuals may have certain characteristics, while in other cases, the one or more individuals may not be associated with a particular set of characteristics. The one or more individuals may provide responses to the request to identify the object. The responses may include identifiers of the object. In various situations, the identifiers may be analyzed and a particular identifier may be selected and provided to the individual requesting the identification of the object.

This Summary is provided to introduce a selection of concepts in a simplified form that are further described below in the Detailed Description. This Summary is not intended to identify key or essential features of the claimed subject matter, nor is it intended to be used to limit the scope of the claimed subject matter.

BRIEF DESCRIPTION OF THE DRAWINGS

The Detailed Description is set forth with reference to the accompanying figures, in which the left-most digit of a reference number identifies the figure in which the reference number first appears. The use of the same reference numbers in the same or different figures indicates similar or identical items or features.

DETAILED DESCRIPTION

Figure 1:
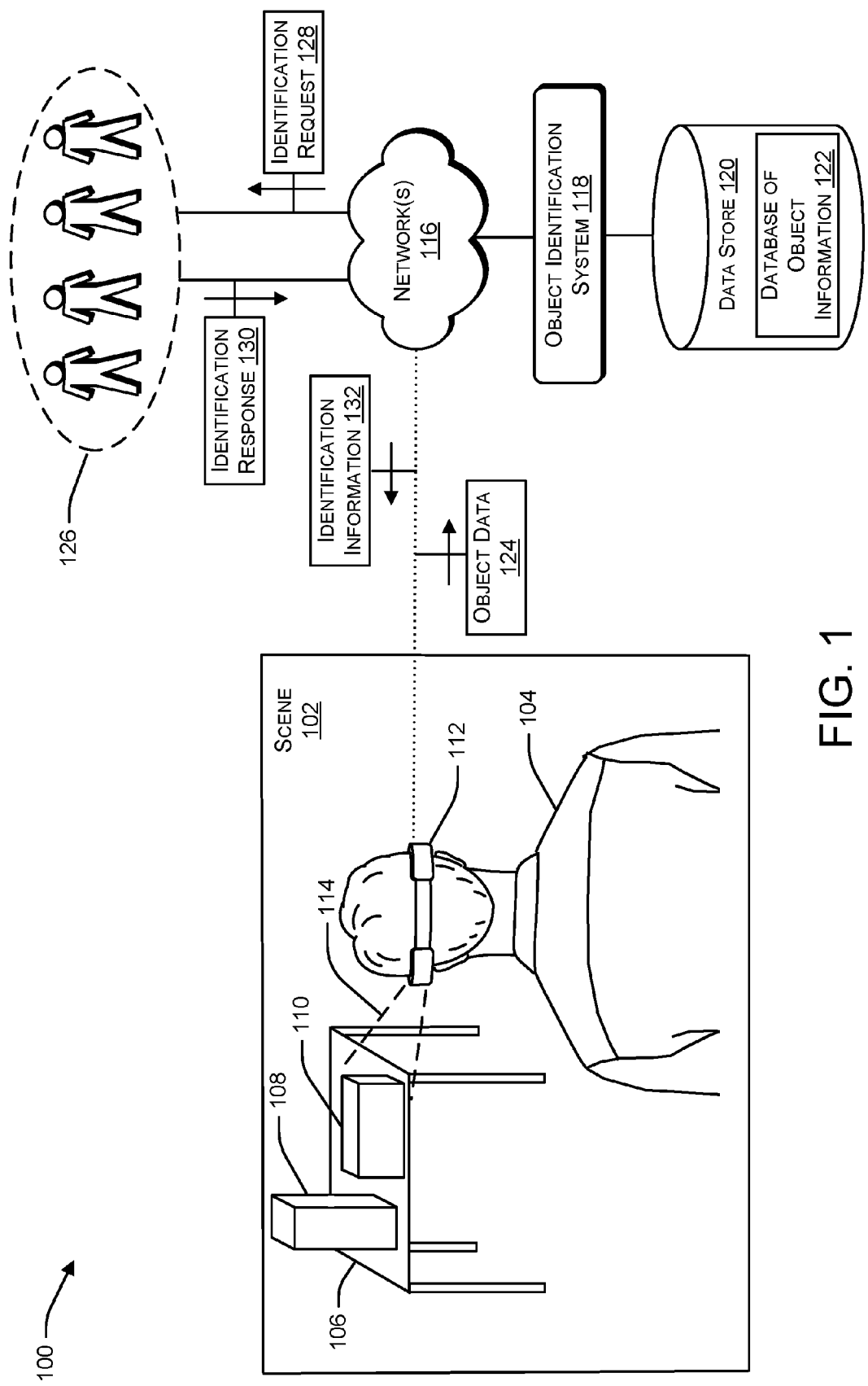
FIG. 1 is a schematic diagram of an example environment to identify objects using gaze tracking techniques.

Described herein are systems and processes to identify objects in a scene using gaze tracking techniques. In particular, objects that are unknown to an individual may be identified using gaze tracking techniques. An unknown object may be included in a scene that is a real-world scene comprising the real-world surroundings of the individual. In other implementations, the unknown object may be included in a virtual reality scene that includes computer-generated surroundings and objects. In additional implementations, the unknown object may be included in a mixed reality scene that includes both the real-world surroundings of an individual and computer-generated surroundings and objects.

When an individual encounters an unknown object in a scene, the individual may provide a request to a computer-implemented system to identify the object. For example, the system may receive audible input from an individual using a verbal expression, such as "What is that?", or one or more sounds, to request that the system identify an unknown object. In another example, the system may receive input from an individual that includes a gesture to request that the system identify an object. To illustrate, the system may capture visual input, such as an image or video, of an individual pointing to an object and determine that the individual is requesting identification of the object. In another illustrative, the system may capture images of the eyes of an individual and infer from the motion of the eyes of the individual (e.g., a predetermined number of blinks) that the individual is requesting that an object be identified. In some cases, the system may receive both audible input and visual input from an individual to request that an object is identified. In an additional example, other forms of input may be used to determine that an individual is requesting that an object is identified. In particular, the system may receive text input from an individual to request the identification of an object. In another example, the system may obtain physiological data to determine that an individual is requesting that an object be identified. In some implementations, electroencephalography (EEG) data may be used by the system to determine that an individual is requesting to identify an unknown object.

After the system determines that an individual is requesting to identify an object, the system may identify the object. The system may identify the object using gaze tracking techniques. In particular, the system may obtain data from one or more user-facing cameras capturing images of at least one of the eyes of the individual. The data obtained from the one or more user-facing cameras may be used to determine eye position data defining a position of at least one eye of a user. The system may determine a gaze of the individual based at least partly on the eye position data. The eye position data may also be used to determine a field of view of the gaze of the individual within a scene. In some implementations, the field of view of the gaze of the individual may be referred to herein as a "gaze path." Additionally, the system may obtain data from one or more environment-facing cameras capturing images of a scene that the individual is viewing. Based at least partly on the eye position data and the position of objects in the scene, the system may determine a target object that the user is viewing. In this way, the system may determine an object that the individual is requesting to be identified by the system. In particular implementations, an object or part of an object that an individual is looking at may be referred to herein as a "gaze target".

The system may parse a database that includes information about a number of objects to determine whether or not the object that is unknown to the individual is included in the database. For example, the system may determine characteristics of the object and compare the characteristics of the object in the scene to characteristics of objects in the database. In some cases, the characteristics of the object may be derived from an image of the object. In other cases, the characteristics of the object may correspond with boundaries of the object determined by the system using edge detection techniques. To illustrate, the system may utilize segmentation techniques to determine boundaries of the object in the scene.

In implementations where the system determines that the object that is the subject of the request is included in the database, the system may obtain information about the object from the database. For example, the system may provide an identifier of the object stored in the database to the individual. To illustrate, in response to a question from the individual "What is that?", the system may respond "That object is a violin." The system may also provide additional information such as a category associated with the object, how to use the object, options to purchase the object, historical information about the object, and so forth.

In implementations where the system determines that the object is not included in the database of objects, the system may electronically communicate with one or more additional individuals to identify the object. In particular implementations, the system may send a communication, such as an email or a message, to a group of individuals, where the communication includes a request to identify the object and that includes information related to the object. For example, the system may send a communication including an image of the object captured by a scene-facing camera to the group of individuals. In another example, the system may generate a rendering of the object based on data obtained about the object from the scene and include the rendering in a communication to the group of individuals. The communication may request that the group of individuals provide an identifier for the object. In addition, the communication may request additional information about the object, such as a use of the object or a source of additional information about the object (e.g., a website with information about the object).

The system may receive responses from the group of individuals and determine an identifier for the object based at least partly on the responses. In some implementations, the system may identify one or more words included in a threshold number of responses and associate the object with the one or more words. The system may generate a response to the request of the individual to identify the object that includes the one or more words associated with the object. In some cases, the response may be provided audibly and/or visually. The system may also add information about the object to the database of previously identified objects. In this way, information about newly identified objects may be utilized in subsequent situations where an additional individual is requesting to identify the object.

By using gaze tracking techniques to identify objects, the system may be used to identify objects while minimizing the frustration of a user. In particular, by providing both a user-facing camera and an environment-facing camera, the system may capture images of an individual's eye position and movement in addition to images of an object that the individual is viewing. In some cases, the user-facing camera and the environment-facing camera may be included in a wearable computing device. For example, the wearable computing device may include glasses or a head mounted display. By providing the hardware used to identify an unknown object in a wearable computing device, the convenience to the user is increased. In some cases, at least a portion of the operations performed to identify the object may take place at a location remote from the wearable computing device. In this way, the form factor of the wearable computing device may be reduced. Thus, the wearable computing device may be small and lightweight because the size and weight of computing components included in the wearable computing device may be minimized. In addition, rather than providing an unsatisfactory answer to an individual regarding the identification of the object due to the object being absent from a database of information about objects, the system may obtain information from outside of the system in order to identify the object. Thus, frustration of the individual also decreases by providing an actual answer to the individual that is supported by a number of information sources rather than provided a non sequitur or an incorrect answer.

These and various other example features will be apparent from a reading of the following description and a review of the associated drawings. However, the claimed subject matter is not limited to implementations that solve any or all disadvantages or provide any of the benefits noted in any part of this disclosure.

FIG. 1 is a schematic diagram of an environment 100 to identify objects using gaze tracking techniques. The environment 100 includes a scene 102 that may include an individual 104 and a number of objects, such as a first object 106, a second object 108, and a third object 110. The scene 102 may be a real-world scene that includes tangible, physical objects. In other cases, the scene 102 may be a mixed reality scene that includes objects that are tangible, physical objects and that includes computer-generated images of objects. Additionally, the scene 102 may be a virtual reality scene where the objects are computer-generated. The objects 106, 108, 110 may occupy respective regions in the scene 102 and have dimensions, such as a length, a width, a height, a radius, and the like. In various implementations, one or more of the objects 106, 108, 110 may be 3-dimensional. In other scenarios, one or more of the objects 106, 108, 110 may be 2-dimensional.

The environment 100 also includes a computing device 112. In the illustrative example of FIG. 1, the computing device 112 is a wearable computing device. In some cases, the computing device 112 may include glasses. In other instances, the computing device 112 may include a headset computing device, such as a head mounted display. Although, the computing device 112 is shown in the illustrative example of FIG. 1 as a wearable computing device, in other scenarios, the computing device 112 may include a mobile telephone, a tablet computing device, a laptop computing device, a portable gaming device, a gaming console, a television, or combinations thereof. The computing device 112 may include one or more cameras. For example, the computing device 112 may include a user facing camera that captures images of the individual 104. In addition, the computing device 112 may include an environment-facing camera that captures images of the scene 102. The computing device 112 may also include one or more depth sensing cameras.

The individual 104 may be looking at one or more of the objects 106, 108, 110. The portions of a scene, such as the scene 102 of FIG. 1, that the individual 104 is viewing at a particular time may be referred to herein as "a gaze path" or "a field of view of the gaze" of the individual 104. The gaze path 114 may be determined based at least partly on determining a gaze of the individual 104. In the illustrative example of FIG. 1, at least a portion of the gaze path of the individual 112 is indicated with reference number 114. The computing device 112 may determine the gaze path 114 of the individual 104. In some implementations, the computing device 112 may determine the gaze path 114 of the individual 104 by capturing images of the position and/or movement of at least one of the eyes of the individual 104 utilizing a user-facing camera. In addition, the computing device 112 may determine the gaze path 114 of the individual 104 based at least partly on determining the motion and orientation of the head of the individual 104. In various implementations, the computing device 112 may include one or more sensors that obtain data that may be used to determine the motion and orientation of the head of the individual 104.

The computing device 112 may determine one or more objects that the individual 104 is viewing within the scene 102 based at least partly on the gaze path 114 of the individual 104 and images of the scene 102 captured by one or more environment-facing cameras of the computing device 112. For example, images captured by the computing device 112 of the scene 102 may be analyzed using stereoscopic imaging techniques to determine a distance of the objects 106, 108, 110 from the individual 104. Images of the scene 102 captured by environment-facing cameras of the computing device 112 may also be used to determine respective positions of the objects 106, 108, 110 within the scene. Based on the distance of the objects 106, 108, 110 from the individual 104, the position of the objects 108, 110, 112 within the scene 102, the gaze path 114 of the individual 104, or combinations thereof, the computing device 112 may determine that the individual 104 is viewing one or more of the objects 106, 108, 110.

The computing device 112 may be coupled to one or more networks 116. The one or more networks 116 may include a wired network, a wireless network, or a combination thereof. For example, the one or more networks 116 may include a local area wireless network, a local area wired network, or a wide area wireless network. In some cases, the one or more networks 116 may include the Internet.

The individual 104 may provide a request to identify an object within the scene 102. For example, the individual 104 may not recognize one or more of the objects 106, 108, 110 and the individual 104 may provide a request via one or more input devices of the computing device 112 to identify the unknown object(s). To illustrate, computing device 112 may obtain audible input, visual input, text input, touch input, or combinations thereof, from the individual 104 directed to a request to identify one or more objects within the scene 102. In an illustrative example, the individual 104 may provide one or more sounds, one or more words, one or more gestures, or combinations thereof to indicate a request to identify an object within the scene 102. The computing device 112 may analyze the input from the individual 104 and determine that a request is being provided by the individual 104 to identify one or more objects within the scene 102. In some cases, the computing device 112 may infer that the individual 104 is requesting to identify an object based at least partly on the one or more sounds, one or more words, one or more gestures, or combinations thereof. Based on determining that the individual 104 is requesting to identify one or more objects within the scene 102, the computing device 112 may utilize the gaze path 114 of the individual 104 and images of the objects 106, 108, 110 to determine a gaze target of the request. In example implementations, the computing device 112 may determine based on the gaze path 114 of the individual 104, positions of the objects 106, 108, 110 within the scene 102, distances of the objects 106, 108, 110 from the individual 104, or combinations thereof, that the individual 104 is requesting the computing device 112 to identify the object 110.

The computing device 112 may communicate with an object identification system 118 via the one or more networks 116 to identify the gaze target that the individual 112 is requesting to be identified. The object identification system 118 may be coupled to, or otherwise in communication with, a data store 120. The data store 120 may store a database of object information 122. The database of object information 122 may include information about a number of objects that may be used in object identification. For example, the database of object information 122 may store characteristics of a number of objects. To illustrate, the database of object information 122 may store dimensions of objects, colors of objects, a text-based description of objects, components of objects, a category of objects, combinations thereof, and the like. In addition, the database of object information 122 may store images of objects.

The computing device 112 may send object data 124 to the object identification system 118 based on determining that the individual 104 is requesting to identify the object 110 in the scene 102. The object data 124 may include an image of the object 110. Also, the object data 124 may indicate dimensions of the object 110, colors of the object 110, other characteristics of the object 110, or combinations thereof. The computing device 112 may generate the object data 124 from one or more images of the object 110 that are captured by the computing device 112. In some cases, the computing device 112 may send additional data to the object identification system 118 to identify the object 110. For example, the computing device 112 may send data related to the scene 102 to the object identification system 118. To illustrate, the computing device 112 may send location data indicating a location of the scene 102 to the object identification system 118. In another example, the computing device 112 may send images of the scene 102 that include more than just the object 110. The additional data sent by the computing device 112 to the object identification system 118 may provide indications of a context for the object 110 that may also be used to identify the object 110.

The object identification system 118 may determine whether the object data 124 corresponds to an object included in the database of object information 122. In some implementations, the object identification system 118 may analyze characteristics of the object 110 indicated by the object data 124 in relation to characteristics of objects included in the database of object information 122. In various implementations, the object identification system 118 may analyze one or more images of the object 110 included in the object data 124 with respect to images of objects included in the database of object information 122. In particular implementations, the object identification system 118 may perform image matching techniques to determine whether an image of the object 110 matches an image of an object included in the database of object information 122.

In particular, the object identification system 118 may determine a similarity between characteristics of the object 110 and characteristics of objects included in the database of object information 122. For example, the object identification system 118 may determine that a characteristic of the object 110 corresponds with a characteristic of an object included in the database of object information 122 within a threshold amount. To illustrate, the object identification system 118 may determine whether an outline of a shape of the object 110 corresponds with an outline of a shape of an object included in the database of object information 122 within a specified threshold. In another illustrative example, the object identification system 118 may determine whether an image of the object 110 corresponds with an image of an object included in the database of object information 122 within a threshold amount.

In situations that the object identification system 118 identifies an object included in the database of object information 122 that corresponds with an object that the individual 104 is requesting to be identified, such as the object 110, the object identification system 118 may provide information to the computing device 112 about the object 110 that is stored in the database of object information 122. For example, the object identification system 118 may provide information to the computing device 112 about the object 110, such as an identifier of the object 110 (e.g., a commonly used name of the object 110). The object identification system 118 may also provide additional information about the object 110, such as a typical use of the object 110 or other facts about the object 110.

In scenarios that the object identification system 118 is unable to identify an object included in the database of objects 122 that corresponds with the object 110 that the individual 104 is requesting to identify, the object identification system 118 may communicate with a group of individuals 126 to identify the object 110. To illustrate, the object identification system 118 may send an identification request 128 to computing devices of the group of individuals 126 to identify the object 110. In some cases, the identification request 128 may include an email. In other instances, the identification request 128 may include a message, such as a short messaging service (SMS) message or a multimedia messaging service (MMS) message. The object identification system 118 may include information corresponding to the object data 124 in the identification request 128. For example, the identification request 128 may include an image of the object 110. In another example, the identification request 128 may include one or more characteristics of the object 110.

In response to the identification requests 128, the object identification system 118 may receive one or more identification responses 130 from computing devices of the group of individuals 126. An identification response 130 may include an identifier of an object that is requesting to be identified. In some cases, the identifier may include a name of the object. In an illustrative example, the object identification system 118 may receive an identification response 130 for the object 110 from an individual of the group of individuals 126 that includes an identifier of the object 110. The identification responses 130 may also include additional information, such as a use of the object 110, background information of the object 110, a category related to the object 110, combinations thereof, and the like.

In particular implementations, the object identification system 118 may receive multiple identification responses 130 from the group of individuals 126. In these situations, the object identification system 118 may analyze the identification responses 130 to determine an identifier for the object 110. In various implementations, the object identification system 118 may receive different identifiers for the object 110 in the identification responses 130 from the group of individuals 126. The object identification system 118 may determine a number of instances of each identifier for the object 110 received from the group of individuals 126. Additionally, the object identification system 118 may determine that an identifier that is associated with the greatest number of identification responses 130 is the identifier for the object 110.

The object identification system 118 may send identification information 132 to the computing device 112 that indicates an identifier for the object 110. The identification information 132 may also include additional information included in identification responses 130 from the group of individuals. Further, the identification information 132 may include one or more links to obtain further information about the object 110. For example, the identification information 132 may include a link to a website that includes information about the object 110. The computing device 112 may utilize one or more output devices to provide data included in the identification information 132 to the individual 104. In some cases, the one or more output devices may be components of the computing device 112. In other cases, the one or more output devices may be components of another electronic device proximate to the individual 112. To illustrate, the computing device 112 may provide audible information via one or more speakers to the individual 104 that indicates an identifier of the object 110. In another illustrative example, the computing device 112 may provide visual information via one or more display devices to the individual 104 that indicates an identifier of the object 110. In particular implementations, the computing device 112 may include a projector that projects information about the object 110 into the scene 102. In other implementations, the computing device 112 may include a display device that displays information about the object 110. In additional implementations, the computing device 112 may send signals to a display device proximate to the individual 104, such as a display device of another electronic device or to a television within the scene 102, to display information about the object 110.

In certain implementations, the computing device 112 may receive feedback from the individual 104 regarding the information provided about the object 110. In some examples, the computing device 112 may receive feedback indicating that the individual 104 was not asking for the object 110 to be identified, but for the object 108 to be identified. In other situations, the computing device 112 may receive feedback indicating that the individual 104 does not agree with the identifier of the object 110 provided by the object identification system 118. The computing device 112 may provide at least a portion of the feedback received from the individual 104 to the object identification system 118. The object identification system 118 may then perform additional operations to identify the unidentified object. In particular implementations, the object identification system 118 may communicate with a different group of individuals to identify the unidentified object. In various implementations, the object identification system 118 may provide at least a portion of the feedback from the individual 104 to one or more of the group of individuals 126. Based on the information received by the object identification system 118 from the different group of individuals or from one or more of the individuals of the group of individuals 126, the object identification system 118 may provide another, different identifier for the unidentified object to the computing device 112. In some implementations, the object identification system 118 may determine that after a threshold amount of time, a threshold number of attempts, or both, that the object identification system 118 is unable to identify the object that the individual 104 is requesting to identify.

Although, a number of operations have been described as being performed by the computing device 112, at least a portion of these operations may be performed by other computing devices in communication with the computing device 112 via the one or more networks 116. In some cases, the object identification system 118 may perform some of the operations attributed to the computing device 112 in the description of the illustrative example of FIG. 1. For example, at least a portion of the operations performed to determine objects being viewed by the individual 104 may be performed by one or more other computing devices in communication with the computing device 112 via the one or more networks 116, such as the object identification system 118. To illustrate, the computing device 112 may send image data to the object identification system 118, such as image data showing the position of at least one eye of the individual 104 and image data showing the objects 106, 108, 110 within the scene 102. The object identification system 118 may utilize the image data obtained from the computing device 112 to determine the gaze path 114 of the individual 104 and to identify one or more of the objects 106, 108, 110 that the individual 104 is viewing. The object identification system 112 may then provide the computing device 112 with information indicating the gaze path 114 of the individual 104 and one or more of the objects 106, 108, 110 that the individual 104 is viewing. By performing some operations related to the detection of objects in the scene 102 and/or some operations related to determining the gaze path 114 of the individual 104 at a computing device other than the computing device 112, the computing device 112 may have a smaller form factor. This may allow the computing device 112 to include fewer computer processing resources, fewer memory resources, fewer input devices, fewer output devices, combinations thereof, and so forth. In this way, the weight and/or size of the computing device 112 may be minimized.

Figure 2:
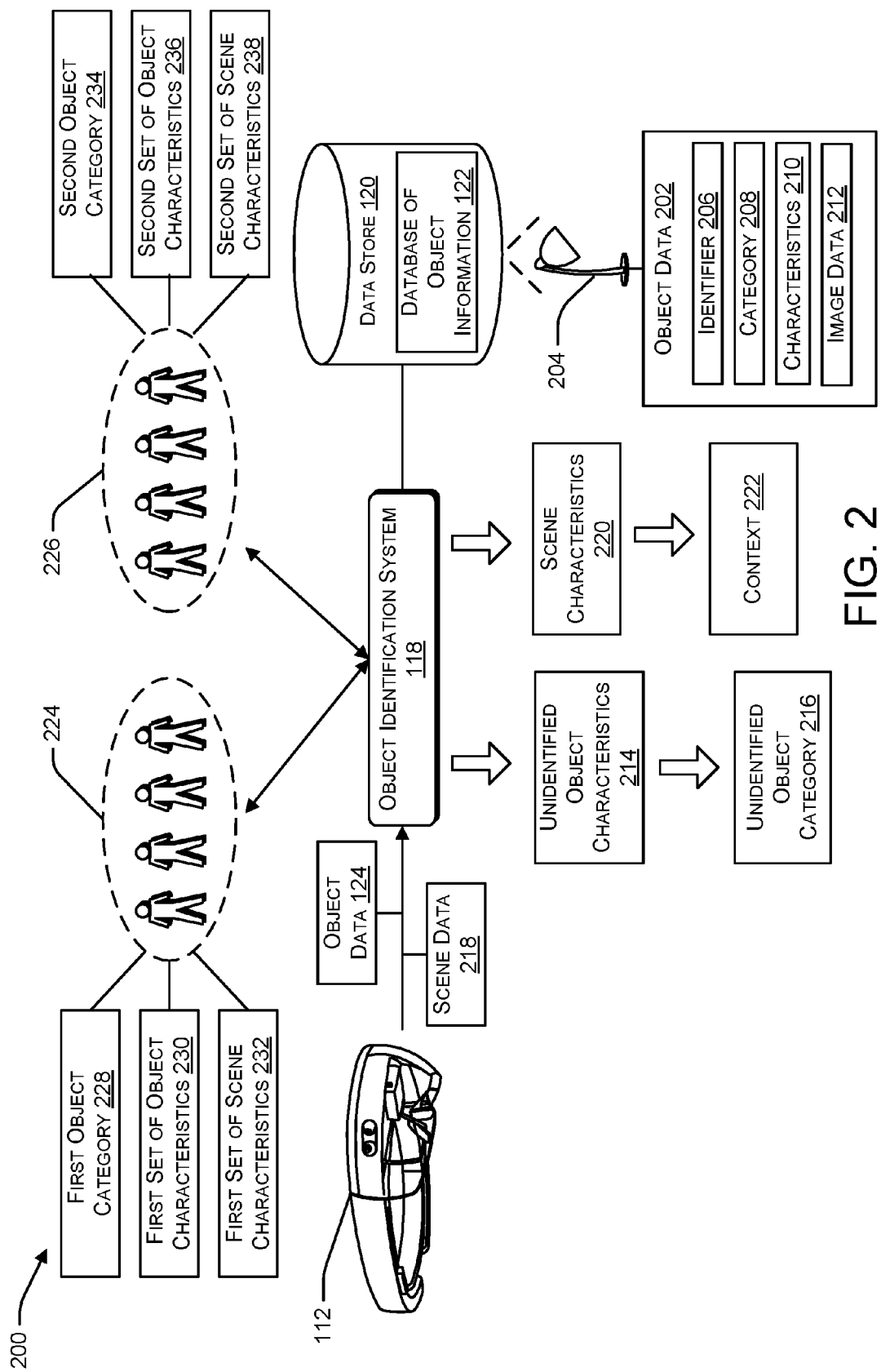
FIG. 2 is a schematic diagram of an additional example environment to identify objects using gaze tracking techniques.

FIG. 2 is a schematic diagram of an additional environment 200 to identify objects using gaze tracking techniques. The additional environment 200 includes some of the components included in the environment 100 of FIG. 1. Although, some of the components of the environment 100 of FIG. 1 are not included in the additional environment 200, it should be understood that the features included in the additional environment 200 of FIG. 2 may operate in conjunction with one or more of the components of the environment 100.

The additional environment 200 includes the object identification system 118 coupled to the data store 120 that stores the database of object information 122. In some implementations, the database of object information 122 may store information according to one or more formats. In the illustrative example of FIG. 2, the database of object information 122 may store object data 202 for a given object 204. The object data 202 may include an identifier 206 that may identify the object 204. For example, the identifier 206 may include one or more letters, symbols, or words that indicate a name of the object 204. To illustrate, the identifier 206 may include a name commonly attributed to the object 204, such as "lamp." In some cases, the object data 202 may include multiple identifiers 206. In an illustrative example, the object 204 may be associated with the identifiers 206 "lamp" and "desk lamp." In other examples, the identifiers 206 may indicate one or more names of the object 204 and include a unique identifier for the object 204 within the database of object information 122. The unique identifier may be used to identify the object 204 within the database of object information 122.

The object data 202 may also include a category 208 that includes a broader term related to one or more of the identifiers 206. For example, the object 204 may be associated with the category 208 of "lighting device" or "lighting." Additionally, the object data 202 may include characteristics 210 that describe the object 204. To illustrate, the characteristics 210 may include contours of the object 204, features of the object 204, dimensions of the object 204, one or more colors of the object 204, a manufacturer of the object 204, a description of the object 204, one or more locations of the object 204, a context where the object 204 may be found, combinations thereof, and the like. Optionally, the object data 202 may include image data 212 that includes one or more images of the object 204.

In particular implementations, the computing device 112 may obtain data about an object that an individual is requesting to be identified and provide the object data 124 to the object identification system 118. The object identification system 118 may analyze the object data 124 and determine unidentified object characteristics 214 for the object to be identified. For example, the object identification system 118 may determine dimensions of the unidentified object, one or more colors of the unidentified object, contours of the unidentified object, one or more images of the unidentified object, combinations thereof, and so forth. The object identification system 118 may compare the unidentified object characteristics 214 with object characteristics stored in the database of object information 122, such as the object characteristics 210. In situations where the object identification system 118 determines that a similarity between the unidentified object characteristics 214 corresponds with characteristics 210 for an object of the database of object information 122, the object identification system 118 may provide at least a portion of the object data 202 to the computing device 112. To illustrate, the object identification system 118 may provide an identifier 206, a category 208, or both to the computing device 212.

Additionally, the object identification system 118 may utilize the unidentified object characteristics 214 to determine an unidentified object category 216. In some implementations, the object identification system 118 may compare the unidentified object category 216 to additional characteristics associated with certain categories of items. The object identification system 118 may identify a category that is associated with characteristics that correspond with the unidentified object characteristics 214 to determine the unidentified object category 216.

The object identification system 118 may also obtain scene data 218 from the computing device 112. The scene data 218 may indicate features of a scene that includes an unidentified object. In particular embodiments, the scene data 218 may be used to determine scene characteristics 220 that indicate additional objects included in the scene, landmarks included in the scene, geographic features included in the scene, location data for the scene, combinations thereof, and so forth. In some cases, the scene data 218 may include one or more images of the scene that included the unidentified object. Further, the object identification system 118 may utilize the scene characteristics 220 to determine a context 222 for the unidentified object. For example, the object identification system 118 may analyze the scene characteristics 220 and determine that the unidentified object is located in an office environment due to the presence of chairs, desks, books, windows, and the like in the scene that includes the unidentified object. In some instances, the context 222 of the unidentified object may be used by the object identification system 118 to determine whether the unidentified object is included in the database of object information 122. To illustrate, the object identification system 118 may compare the context 222 of the unidentified object with characteristics 210 of objects included in the database of object information 122 to narrow down the number of objects that may correspond with the unidentified object.

In scenarios where the object identification system 118 is unable to identify an object using the object data 124 and/or the scene data 218, the object identification system 118 may communicate with one or more groups of individuals to identify the object. In some implementations, the object identification system 118 may select from a number of groups of individuals based on characteristics associated with each group and based on the unidentified object characteristics 214. For example, one group of individuals may be designated to identify objects having a certain set of characteristics and another group of individuals may be designated to identify additional objects having a different set of characteristics. In various implementations, the individuals included in the groups may overlap. That is, an individual may be included in multiple groups. The groups of individuals may be organized according to characteristics of the individuals. To illustrate, the groups of individuals may be organized according to educational background, work experience, personal information, geographic location, combinations thereof, and the like. In this way, individuals may be organized in a manner that corresponds with objects that they may be more likely to identify. By organizing the groups of individuals that receive requests to identify objects according to characteristics of the individuals, the efficiency of processes of identifying objects may be maximized. Accordingly, the use of computing and memory resources may be minimized. Furthermore, the use of network resources may be minimized because a subset of particular individuals receives requests to identify objects rather than a broader group of individuals. Thus, the amount of communication exchanged over networks is minimized.

In the illustrative example of FIG. 2, the additional environment 200 includes a first group of individuals 224 and a second group of individuals 226 to identify objects. The first group of individuals 224 may be associated with a first object category 228, a first set of object characteristics 230, and a first set of scene characteristics 232. That is, the object identification system 118 may determine, based on a first set of characteristics of the first group of individuals 224, that the first group of individuals 224 is likely to identify objects associated with the first object category 228, objects having a first set of object characteristics 230, and objects in locations having a first set of scene characteristics 232. Additionally, the second group of individuals 226 may be associated with a second object category 234, a second set of object characteristics 236, and a second set of scene characteristics 238. Thus, the object identification system 118 may determine, based on a second set of characteristics of the second group of individuals 226, that the second group of individuals 226 is likely to identify objects associated with the second object category 234, objects having the second set of object characteristics 236, and objects in locations having a second set of scene characteristics 238. In an illustrative example, the object identification system 118 may determine that the first group of individuals 224 is likely to identify objects related to an office products category, objects having characteristics of office products, and objects located in an office environment or a store that sells office products. In another illustrative example, the object identification system 118 may determine that the second group of individuals 226 is likely to identify objects related to a kitchen products category, objects having characteristics of kitchen products, and objects located in a kitchen, a restaurant, or a store that sells kitchen products.

In situations where the object identification system 118 determines that an object is not included in the database of object information 122, the object identification system 118 may identify a group of individuals to identify the object. In particular implementations, the object identification system 118 may determine a similarity between the unidentified object characteristics 214, the unidentified object category 216, the scene characteristics 220, the context 222, or combinations thereof, with the corresponding data for a particular group of individuals. The object identification system 118 may send communications to the particular group of individuals including a request to identify the object. In addition, the particular group of individuals may send responses to the object identification system 118 that identify the object.

In an illustrative implementation, the object identification system 118 may perform a first comparison between the unidentified object characteristics 214 with the first set of object characteristics 230 and the second set of object characteristics 236. Additionally, the object identification system 118 may perform a second comparison between the unidentified object category 216 and the first object category 228 and the second object category 234. Further, the object identification system 118 may perform a third comparison between the scene characteristics 220 and the context 222 with the first set of scene characteristics 232 and the second set of scene characteristics 238. Based at least partly on the first comparison, the second comparison, and/or the third comparison, the object identification system 118 may determine that the first group of individuals is likely to identify the unidentified object. The object identification system 118 may then send communications to computing devices of the first group of individuals 224 related to identifying the unidentified object.

Figure 3:
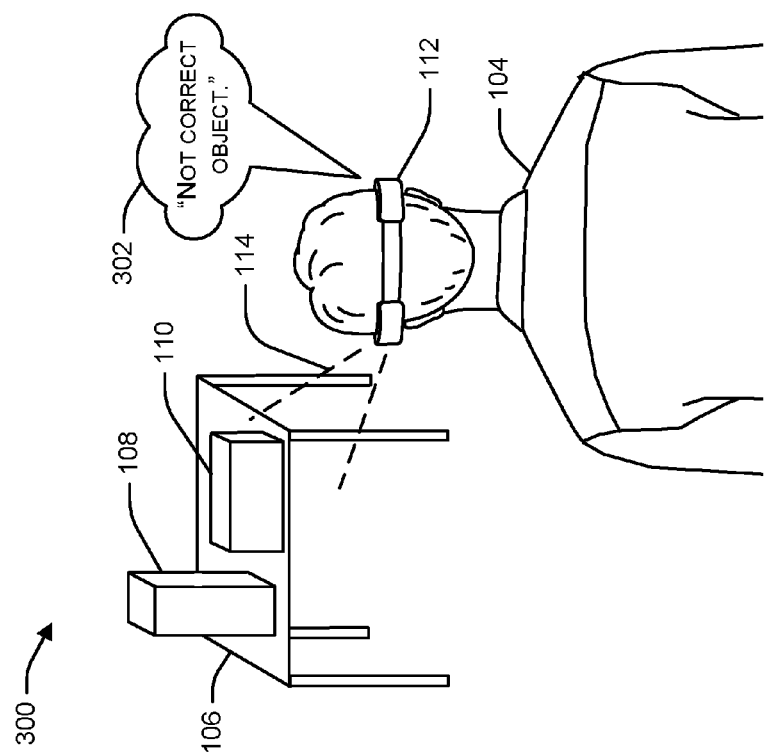
FIG. 3 is a diagram illustrating an example environment that includes a number of objects and an individual providing input that an object has been incorrectly identified.

FIG. 3 is a diagram illustrating an environment 300 that includes a number of objects 106, 108, 110 and an individual 104 providing input that an object has been incorrectly identified. In particular, the environment 300 is similar to the environment 100 of FIG. 1, except that in the environment 300, the information provided by the object identification system 118 of FIG. 1 does not correspond with the object that the individual 104 would like to identify. In some cases, the computing device 112, the object identification system 118 of FIG. 1, or both may determine the gaze path 114 of the individual 104 and identify an object that the individual 104 would like to identify. In the illustrative example of FIG. 1, the computing device 112, the object identification system 118 of FIG. 1, or both may determine that the individual 104 would like to identify the third object 110. In scenarios where the computing device 112, the object identification system 118 of FIG. 1, or both provide information about an object that the individual 104 did not request to be identified, the computing device 112 may receive input from the individual 104 indicating that the individual 104 is requesting the identification of a different object. In the illustrative example of FIG. 3, the individual 104 provides audible input 302 indicating that the information provided by the computing device 112 was related to an object that the individual 104 did not want to identify.

Figure 4:
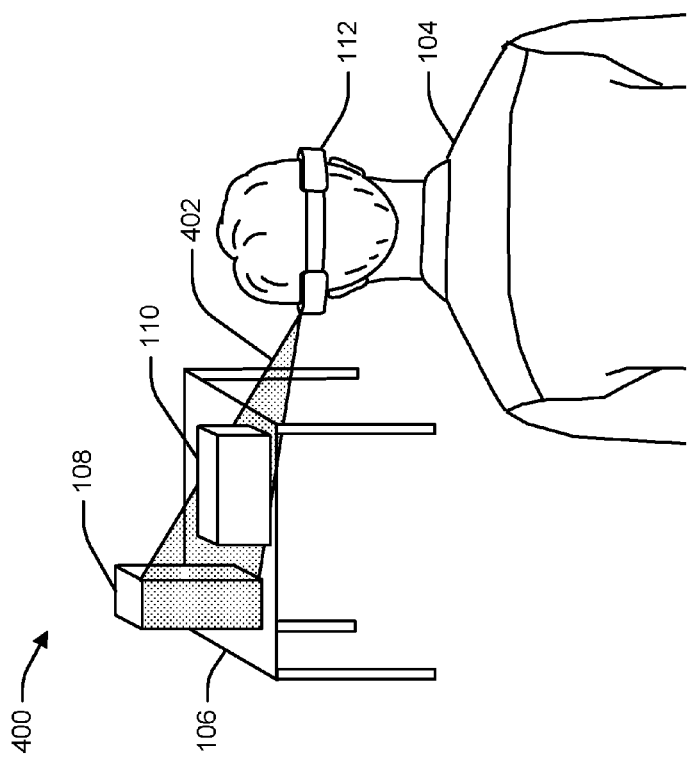
FIG. 4 is a diagram illustrating an example environment that includes a computing device utilizing techniques to correctly identify an object that an individual is requesting to be identified.

FIG. 4 is a diagram illustrating an environment 400 that includes a computing device 112 utilizing techniques to correctly identify an object that an individual 104 is requesting to be identified. In particular, after receiving input 302 from the individual 104 that the computing device 112 provided information regarding an object in the environment 400 that the individual 104 did not want to identify, the computing device 112 may perform additional operations to determine the object in the environment 400 that the individual 104 is requesting to identify. For example, the computing device 112 may project a mesh 402 into the environment 400 onto other objects in the environment 400. In the illustrative example of FIG. 4, the computing device 112 is projecting the mesh 402 onto the second object 108. In this way, the computing device 112 may highlight objects within the environment 400 to more specifically determine an object that the individual 104 would like to identify. In some cases, the computing device 112 may provide additional output asking the individual 104 whether the object onto which the mesh 402 is projected is the object that the individual 104 would like to identify. Additionally, the individual 104 may provide audible input, gesture input, or both indicating that the object onto which the mesh 402 is projected is the actual object that the individual 104 is requesting to identify.

Figure 5:
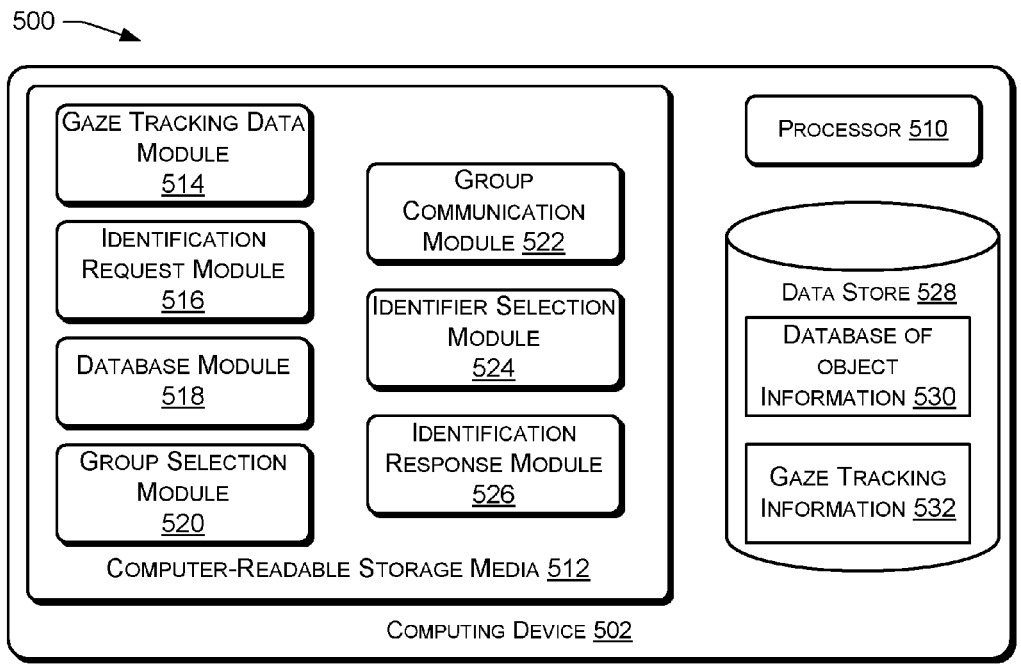
FIG. 5 is a block diagram illustrating an example system to identify objects using gaze tracking techniques.
Figure 5:
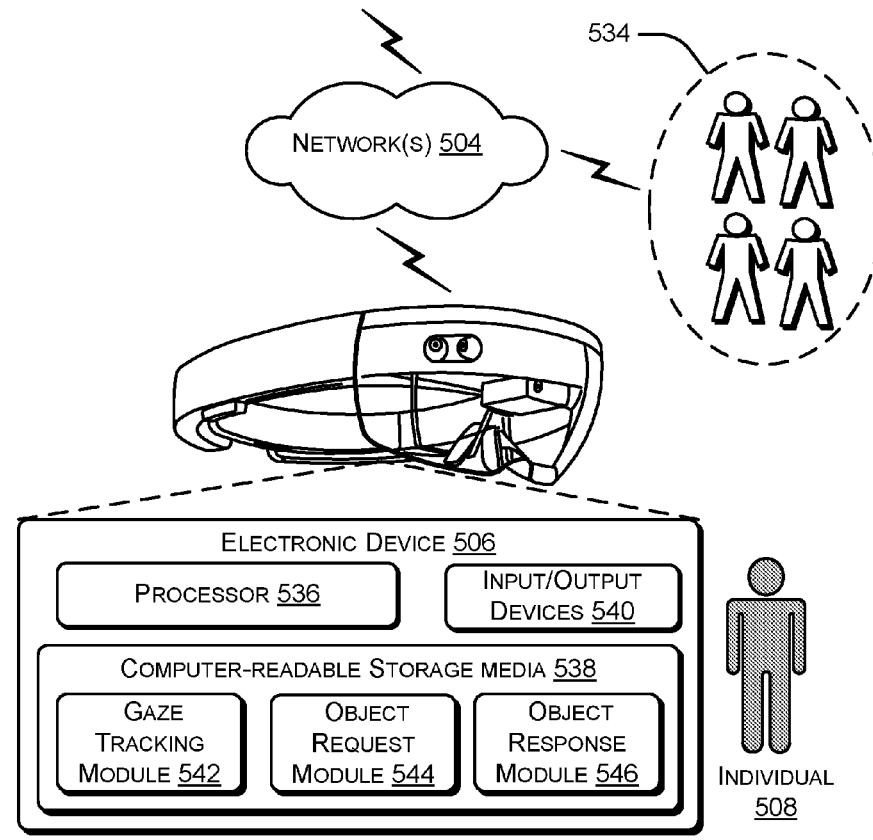

FIG. 5 is a block diagram illustrating an example system 500 to identify objects using gaze tracking techniques. The system 500 includes a computing device 502 that may be used to perform at least a portion of the operations to identify objects using gaze tracking techniques. The computing device 502 may be associated with an entity that is a service provider that provides services related to identifying objects using gaze tracking techniques. Additionally, the computing device 502 may be associated with a manufacturer of the electronic device 506, a distributor of the electronic device 506, or both. The computing device 502 may include one or network interfaces (not shown) to communicate with other computing devices via one or more networks 504. The one or more networks 504 may include one or more of the Internet, a cable network, a satellite network, a wide area wireless communication network, a wired local area network, a wireless local area network, or a public switched telephone network (PSTN).

In particular embodiments, the computing device 502 may communicate via the one or more networks 504 with an electronic device 506 associated with an individual 508. The electronic device 506 may include a laptop computing device, a tablet computing device, a mobile communications device (e.g., a mobile phone), a wearable computing device (e.g., watch, glasses, fitness tracking device, a head mounted display, jewelry), a portable gaming device, combinations thereof, and the like. The individual 508 may utilize the electronic device 506 to generate requests to identify objects that are unknown to the individual 508.

The computing device 502 may include one or more processors, such as processor 510. The one or more processors 510 may include at least one hardware processor, such as a microprocessor. In some cases, the one or more processors 510 may include a central processing unit (CPU), a graphics processing unit (GPU), or both a CPU and GPU, or other processing units. Additionally, the one or more processors 510 may include a local memory that may store program modules, program data, and/or one or more operating systems.

In addition, the computing device 502 may include one or more computer-readable storage media, such as computer-readable storage media 512. The computer-readable storage media 512 may include volatile and nonvolatile memory and/or removable and non-removable media implemented in any type of technology for storage of information, such as computer-readable instructions, data structures, program modules, or other data. Such computer-readable storage media 512 may include, but is not limited to, RAM, ROM, EEPROM, flash memory or other memory technology, CD-ROM, digital versatile disks (DVD) or other optical storage, magnetic cassettes, magnetic tape, solid state storage, magnetic disk storage, RAID storage systems, storage arrays, network attached storage, storage area networks, cloud storage, removable storage media, or any other medium that may be used to store the desired information and that may be accessed by a computing device. Depending on the configuration of the computing device 502, the computer-readable storage media 512 may be a type of tangible computer-readable storage media and may be a non-transitory storage media.

The computer-readable storage media 512 may be used to store any number of functional components that are executable by the one or more processors 510. In many implementations, these functional components comprise instructions or programs that are executable by the one or more processors 510 and that, when executed, implement operational logic for performing the operations attributed to the computing device 502. Functional components of the computing device 502 that may be executed on the one or more processors 510 for implementing the various functions and features related to identifying objects using gaze tracking techniques, as described herein, include a gaze tracking data module 514, an identification request module 516, a database module 518, a group selection module 520, a group communication module 522, an identifier selection module 524, and an identification response module 526. One or more of the modules 516, 518, 520, 522, 524, 526 may be used to implement the object identification system 118 of FIG. 1 and FIG. 2.

The computing device 502 may also include, or is coupled to, a data store 528 that may include, but is not limited to, RAM, ROM, EEPROM, flash memory, one or more hard disks, solid state drives, optical memory (e.g. CD, DVD), or other non-transient memory technologies. The data store 528 may maintain information that is utilized by the computing device 502 to perform operations related to identifying objects using gaze tracking techniques. For example, the data store 528 may a database of object information 530. In addition, the data store 528 may store gaze tracking information 532 related to determining gaze of an individual.

The database of object information 530 may store information about a number of different objects that have been previously identified. For each object included in the database of object information 530, the database of object information 530 may store one or more identifiers of the object, one or more categories of the object, one or more characteristics of the object, one or more contexts of the object, one or more images of the object, or combinations thereof. In some cases, an identifier of an object included in the database of object information 530 may include a common name for the object, a manufacturer name for the object, a manufacturer number for the object, a unique identifier used to identify the object within the database of object information 530, a universal product code (UPC), another identifier of the object, or combinations thereof. In addition, a category of an object included in the database of object information 530 may be associated with a number of objects and may be designated by an entity that is providing resources to identify objects using gaze tracking techniques, such as a service provider, a manufacturer of the electronic device 506, a distributor of the electronic device 506, or a combination thereof. Further, a context of an object included in the database of object information 530 may be related to characteristics of environments in which the object may be located. In some cases, the context may include a particular location, such as the Tower of London, while in other cases, the context may include a more general location, such as a kitchen. The context may also include latitude and longitude coordinates, another geographic location identifier, or both. Also, the characteristics of an object included in the database of object information 530 may include a shape of the object, dimensions of the object, contours of the object, features of the object, one or more colors of the object, materials that comprise the object, textures of the object, combinations thereof, and the like. The images of an object included in the database of object information 530 may include images of a plurality of different instances of object, images of a plurality of views of the object, images of scenes including the object, combinations thereof, and so forth.

The gaze tracking information 532 stored in the data store 528 may include information used to determine gaze of an individual. In some cases, the gaze tracking information 532 may include eye position data for one or more individuals. In addition, the gaze tracking information 532 may include distances of facial features of individuals, reference points, and other information that may be used to determine gaze of an individual. Optionally, portions of the gaze tracking information 532 may be cached or otherwise stored temporarily such that gaze calculations are performed. After gaze calculations are performed, at least a portion of the gaze tracking information 532 may be discarded to minimize the memory resources used to identify objects using gaze tracking techniques.

The gaze tracking data module 514 may include computer-readable instructions that are executable by the processor 510 to obtain data that may be used to determine a gaze path of an individual. In some cases, the gaze tracking data module 514 may obtain data from the electronic device 506 that may be used to determine gaze of an individual, such as the individual 508. For example, the gaze tracking data module 514 may obtain data indicating the position of at least one eye of an individual. In various implementations, the gaze tracking module 514 may obtain images of at least one eye of an individual and analyze the images to determine eye position of an individual. The eye positions of an individual may be used to determine the gaze path of the individual. In particular implementations, the eye positions of an individual may be used to determine a direction in which an individual is looking. In some cases, the gaze path of an individual may be approximated as a cone shaped field of view or a triangular prism shaped field of view into a scene.

The gaze tracking module 514 may also identify objects included in the gaze path of an individual. In particular implementations, the gaze tracking data module 514 may obtain information indicating positions of objects included in a scene that an individual is viewing. In some cases, the gaze tracking data module 514 may obtain images of a scene and utilize the images of the scene to determine locations of objects included in the scene. In an illustrative example, the gaze tracking data module 514 may determine distances between objects included in a scene and a reference point of the scene. In addition, the gaze tracking data module 514 may determine distances between objects included in a scene and an individual viewing the scene. The gaze tracking data module 514 may determine overlap between the gaze path of an individual and the location of one or more objects in a scene. The one or more objects included in the gaze path of the individual may be specified as gaze targets.

The identification request module 516 may include computer-readable instructions that are executable by the processor 510 to determine that an individual is requesting to identify an object that is unknown to the individual. In some cases, the identification request module 516 may obtain the request from the electronic device 506. In other cases, the identification request module 516 analyze data received from the electronic device 506 to determine that an individual is requesting to identify an object. The identification request module 516 may obtain audible data, visual data, sensor data, or a combination thereof, from the electronic device 516. The audible data may include one or more words, one or more sounds, or both. The visual data may include one or more gestures. In addition, the sensor data may include physiological data, such as EEG data. The identification request module 516 may analyze the audible data, the visual data, the sensor data, or a combination thereof, to determine that an individual is requesting the identification of an object.

In particular implementations, one or more predetermined sounds, one or more predetermined words, or a combination thereof, may be designated as indicating a request to identify an object. The identification request module 516 may determine a similarity between audible data obtained from the electronic device 506 and the predetermined words and/or predetermined sounds. The identification request module 516 may determine that the words and/or sounds of the audible data satisfy a similarity threshold with the predetermined words and/or predetermined sounds indicating a request to identify an object. In these situations, the identification request module 516 may determine that a request to identify an object has been received. In additional implementations, one or more predetermined gestures may be designated as indicating a request to identify an object. The identification request module 516 may determine a similarity between the visual data and the one or more predetermined gestures. In some cases, the identification request module 516 may determine that a gesture indicated by the visual data satisfies a similarity threshold with respect to at least one of the predetermined gestures designated as indicating a request to identify an object. In these instances, the identification request module 516 may determine that a request to identify an object has been received. Further, one or more predetermined EEG patterns may be designated as indicating a request to identify an object. The identification request module 516 may determine a similarity between an EEG pattern included in the sensor data and one or more EEG patterns designated as indicating a request to identify an object. In various implementations, the identification request module 516 may determine that an EEG pattern of the sensor data satisfies a similarity threshold with respect to a predetermined EEG pattern and the identification request module 516 may then determine that a request to identify an object has been received.

The database module 518 may include computer-readable instructions that are executable by the processor 510 to identify objects that are included in the database of object information 530 and objects that are absent from the database of object information 530. For example, based at least partly on a gaze target being identified by the gaze tracking data module 514 and/or the electronic device 506 and based at least partly on a request to identify an object being received by the identification request module 516, the database module 518 may analyze features of the gaze target to determine whether the gaze target is stored in the database of object information 530. In particular implementations, the database module 518 may analyze information related to the gaze target to determine characteristics of the gaze target. Additionally, the database module 518 may analyze information related to a scene in which the gaze target is located to determine characteristics of the scene. In some cases, the database module 518 may analyze one or more images of the gaze target, one or more images of the scene that includes the object, or both to determine characteristics of the object and/or characteristics of the scene. Further, the database module 518 may derive additional information based on analyzing images of the object, images of the scene, or both. To illustrate, the database module 518 may determine a category of the object based at least partly on the characteristics of the object. Also, the database module 518 may determine a context of the object based at least partly on the characteristics of the scene. In various implementations, the category of the object may correspond with one or more categories of objects associated with the database of object information 530. In addition, the context of the object may correspond with one or more contexts of objects associated with the database of object information 530.

The database module 518 may determine similarities between one or more characteristics of the object, a category of the object, characteristics of the scene, context of the object, or combinations thereof, and the corresponding features of objects included in the database of object information 530. For example, the database module 518 may determine a similarity between characteristics of a gaze target and characteristics of objects included in the database of object information 530. In addition, the database module 518 may determine a similarity between a category of a gaze target and categories of objects included in the database of object information 530. Also, the database module 518 may determine a similarity between characteristics of a scene that includes a gaze target and characteristics of scenes that include objects of the database of object information 530. Further, the database module 530 may determine a similarity between a context of the gaze target and contexts of objects included in the database of object information 530. In some cases, a similarity between a first characteristic of a gaze target and a second characteristic of an object included in the database of object information 530 may be expressed numerically, such as in a similarity score. In various implementations, similarity threshold may be expressed as a numerical floor with respect to a similarity score.

In situations where the database module 518 determines that one or more similarities between characteristics of a gaze target and characteristics of one or more objects included in the database of object information 530 satisfy a similarity threshold, the database module 518 may determine that the gaze target is included in the database of object information 530. For example, the database module 518 may determine that a similarity between one or more characteristics of a gaze target with respect to corresponding characteristics of an object included in the database of object information 530 satisfies a similarity threshold. In these situations, the database module 518 may determine that the gaze target corresponds with an object of the database of object information 530. To illustrate, the database module 518 may determine that contours of a gaze target satisfy a similarity threshold with respect to contours of an object included in the database of object information 530. In another illustrative example, the database module 518 may determine that an image of the gaze target satisfies a similarity threshold with respect to an image of an object included in the database of object information 530.

In situations where the database module 518 determines that a similarity between one or more features of a gaze target do not satisfy a similarity threshold with respect to features of objects of the database of object information 530, the database module 518 may determine that the gaze target is absent from the database of object information 530. In an example, the database module 518 may determine that characteristics of the gaze target, a category of the gaze target, a context of the gaze target, characteristics of a scene of the gaze target, or combinations thereof, do not satisfy a similarity threshold with respect to corresponding object characteristics, object categories, scene characteristics, contexts, or combinations thereof, for objects included in the database of object information 530. The database module 518 may invoke the group selection module 520 based on determining that a gaze target is absent from the database of object information 530.

The group selection module may include computer-readable instructions that are executable by the processor 510 to determine a group of individuals to provide with requests to identify the gaze target. In some cases, the group selection module 520 may access a list of individuals and determine that requests to identify the gaze target are to be sent to one or more computing devices of the individuals included on the list. Additionally, the group selection module 520 may identify a subset of the individuals included in the list to contact regarding the identification of a gaze target. For example, the group selection module 520 may rotate among a certain number of individuals included in the list each time that a request to identify an object is to be sent.

In particular implementations, the group selection module 520 may evaluate individuals included in the list based on one or more criteria to determine a group of individuals to contact about identifying a gaze target that is absent from the database of object information 530. In an example, groups of individuals may be associated with one or more features of objects, such as one or more categories of objects, one or more characteristics of objects, one or more characteristics of scenes, one or more contexts of objects, other criteria, or combinations thereof. The group selection module 520 may determine a similarity between the one or more features associated with the groups and one or more features of an object to be identified. To illustrate, the group selection module 520 may determine a similarity between one or more object characteristics associated with a group of individuals and one or more characteristics of an object to be identified. In another illustration, the group selection module 520 may determine a similarity between a category associated with a group of individuals and a category of an object to be identified. In an additional illustrative example, the group selection module 520 may determine a similarity between a context associated with a group of individuals and a context of an object to be identified. Further, the group selection module 520 may determine a similarity between one or more characteristics of a scene associated with a group of individuals and one or more characteristics of a scene of an object to be identified. In some implementations, the similarity may be expressed numerically as a similarity score.

The group selection module 520 may determine that a similarity between one or more features of a group of individuals and one or more features of an object satisfy a similarity threshold. In these situations, the group selection module 520 may determine that the group is to be contacted regarding the identification of the object. In some cases, the group selection module 520 may identify multiple groups that satisfy a similarity threshold with regard to one or more features of the object to be identified. The group selection module 520 may, in some cases, rank the groups. The group selection module 520 may determine that a group with the greatest ranking is to be contacted in regard to identifying the object. In other instances, the group selection module 520 may determine that multiple groups satisfying the similarity threshold are to be contacted regarding the identification of the object. In an illustrative example, the group selection module 520 may determine that at least the group of individuals 534 is to be contacted regarding the identification of the object.

The group communication module 522 may include computer-readable instructions that are executable by the processor 510 to send communications to computing devices of a group of individuals to identify an object, such as computing devices of the group of individuals 534. The communications may include a request to identify the object. Additionally, the communications may include information regarding the object to be identified. For example, the communications may include a description of the object to be identified, a context of the object to be identified, a description of other objects proximate to the object to be identified, one or more images of the object to be identified, one or more images of a scene including the object to be identified, or combinations thereof. In particular implementations, the communications may include an email, a message (e.g., a short message service (SMS) message, a multimedia messaging service (MMS) message), an audio message, a video message, or combinations thereof. In other implementations, the group communication module 522 may communicate with one or more groups of individual to identify an object via a mobile device app. Also, the group communication module 522 may generate information corresponding to a user interface that may be accessible to one or more groups of individuals and that may capture information regarding the identification of the object. In various implementations, the communications may include a structured form that may include one or more data capture elements in which one or more identifiers of the object may be provided.

In scenarios where one or more images are included in the communications to at least one group of individuals, the group communication module 522 may modify an image of a scene that includes the object to be identified. For example, a scene that includes the object may include additional features, such as other objects, people, landmarks, and so forth. In some cases, the additional features included in the image may be used to identify a person or may be inappropriate for some individuals to view. The group communication module 522 may analyze the image and identify features that may be removed from the image that are related to privacy or inappropriate content. Additionally, the group communication module 522 may modify the image by removing the privacy related features and/or the inappropriate content before including the image in a communication to a group of individuals related to identifying the object.

The group communication module 522 may receive responses from one or more individuals of at least one group of individuals in regard to a request to identify an object. The group communication module 522 may also extract identifiers of objects from the responses. In some cases, the group communication module 522 may obtain identifiers related to a particular data capture element of communications sent to the group of individuals. In other situations, the group communication module 522 may parse text of a response to determine an identifier of the object.

The identifier selection module 524 may include computer-readable instructions that are executable by the processor 510 to analyze identifiers included in responses received from groups of individuals. When responses are received for a particular object, the identifier selection module 524 may obtain the identifiers of the object from the group communication module 522 and determine a number of occurrences of each identifier. The identifier selection module 524 may then rank the identifiers according to the number of occurrences of each identifier. In some cases, the identifier selection module 524 may identify the identifier with the greatest ranking, that is, the identifier having the greatest number of occurrences in the responses. The identifier selection module 524 may attribute the identifier with the greatest ranking with the object. In some implementations, the identifier selection module 524 may attribute multiple identifiers included in the responses with the object. For example, the identifier selection module 524 may determine a plurality of identifiers having a threshold number of occurrences in the responses.

In various implementations, after the identifier selection module 524 has determined one or more identifiers for the object, the identifier selection module 524 may add the object to the database of object information 530. For example, the identifier selection module 524 may store the identifier of the object in addition to other information about the object, such as characteristics of the object, one or more contexts of the object, one or more characteristics of scenes in which the object may be located, a category of the object, or combinations thereof. In some cases, the information stored in the database of object information 530 related to the object may be obtained from one or more responses received from at least one group of individuals. Also, the identifier selection module 524 may utilize an identifier associated with the object to crawl websites to obtain information about the object and store the corresponding information in the database of object information 530. In some cases, a unique identifier may be associated with the object in order to index the object in relation to the database of object information 530, such that information about the object may be accessed in relation to subsequent requests to identify objects.

The identification response module 526 may include computer-readable instructions that are executable by the processor 510 to send responses to individuals based on requests to identify objects. The identification response module 526 may obtain an identifier of an object that is the subject of an identification request and communicate the identifier to one or more computing devices of the individual making the request. In some cases, the communication may include an email, a SMS message, a MMS message, an audio message, a video message, or a combination thereof. In other cases, the communication may be provided via a mobile device app, a user interface that is accessible via a website, or both. Further, the identification response module 526 may generate data that may be sent to an electronic device, such as the electronic device 506, and used by the electronic device to communicate the identifier to an individual. In some cases, the data sent to the electronic device may include audible output, visual output, or both.

In addition, the identification response module 526 may receive feedback from a computing device of an individual that the identifier of the object was not correct, that the wrong object was identified, or both. In these situations, the identification response module 526 may communicate with an electronic device of the individual to identify the correct object that is the subject of an object identification request and/or invoke the group selection module 520, the group communication module 522, or both to send additional requests to at least one group of individuals to identify the correct object. In some cases, the new requests may be sent to the same group that incorrectly identified the initial object. In other cases, the group selection module 520 may determine a different group to contact regarding the identification of the object. In further implementations, the identifier selection module 524 may be invoked to select a different identifier from the responses received for the original object to provide to the individual.

The electronic device 506 of the system 500 may include a processor 536 and computer-readable storage media 538. The processor 536 may include a hardware-processing unit, such as a central processing unit, a graphics processing unit, or both. In an implementation, the computer-readable storage media 538 may include volatile and nonvolatile memory and/or removable and non-removable media implemented in any type of technology for storage of information, such as computer-readable instructions, data structures, program modules, or other data. Such computer-readable storage media 538 may include, but is not limited to, RAM, ROM, EEPROM, flash memory or other memory technology, CD-ROM, digital versatile disks (DVD) or other optical storage, solid state storage, magnetic disk storage, removable storage media, or any other medium that may be used to store the desired information and that can be accessed by the electronic device 506. Depending on the configuration of the electronic device 506, the computer-readable storage media 538 may be a type of tangible computer-readable storage media and may be a non-transitory storage media. The electronic device 506 may also include one or network interfaces (not shown) to communicate with other computing devices via the one or more networks 504.

The electronic device 506 may also include one or more input/output devices 540. The input/output devices 540 may include one or more sensors. In at least one example, the input/output devices 540 may include sensor(s) that may include any device or combination of devices configured to sense conditions of the individual 508 or surroundings of the individual 508. The input/output devices 540 may include one or more user facing cameras or other sensors for tracking eye movement or gaze, facial expressions, pupil dilation and/or contraction, gestures, and/or other characteristics of the user. In some examples, the input/output devices 540 may include one or more outwardly facing or environmental cameras for capturing images of real-world objects and surroundings of the individual 508. The input/output devices 540 may additionally or alternatively include one or more biometric sensors (e.g., a galvanic skin response sensor for measuring galvanic skin response, a heart rate monitor, a skin temperature sensor for measuring the temperature on the surface of the skin, an electroencephalography (EEG) device for measuring electrical activity of the brain, an electrocardiography (ECG or EKG) device for measuring electrical activity of the heart), one or more other cameras (e.g., web cameras, infrared cameras, depth cameras, etc.), microphones or other sound sensors for measuring a volume of speech, a rate of speech, etc., light sensors, optical scanners, or the like.

Individual input/output devices 540 may output data to one or more module(s) for suitable processing, such as a gaze tracking module 542, an object request module 544, and an object response module 546. For instance, a user facing camera may capture gaze tracking data which may be processed by the gaze tracking module 542 to determine one or more gaze targets and/or a gaze path of the individual 508. The gaze tracking module 542 may then output the gaze targets and/or gaze path to the object request module 544 or to the computing device 502 to generate requests to identify a gaze target.

In additional and/or alternative examples, the input/output devices 540 may include any device or combination of devices configured to detect a position or movement of the electronic device 506 and other objects. For instance, the input/output devices 540 may additionally and/or alternatively include a depth map sensor, a light field sensor, a gyroscope, a sonar sensor, an infrared sensor, a compass, an accelerometer, a global positioning system (GPS) sensor, and/or any other device or component for detecting a position or movement of the electronic device 506 and/or other objects. The input/output devices 540 may also enable the generation of data characterizing interactions, such as user gestures, with the electronic device 506. For illustrative purposes, the input/output devices 540 may enable the generation of data defining a position and aspects of movement, e.g., speed, direction, acceleration, of one or more objects, which may include the electronic device 506, physical items near the electronic device 506, and/or users.

In some implementations, at least some of the input/output devices 540 may be part of, or built into, the electronic device 506. More specifically, the electronic device 506 may include a user facing camera sensor and/or an environmental camera disposed in or integrated with a nose-bridge component of the electronic device 506. As described above, the electronic device 506 may include any configuration of one or more input/output devices 540 that may be part of, or built into, the electronic device 506. However, in some examples, one or more of the input/output devices 540 may be removably coupled to the electronic device 506, or be separate from and communicatively coupled to the electronic device 506. In the latter case, data from the input/output devices 540 may be communicated from the input/output devices 540 to the electronic device 506, for example, via a wired and/or wireless network, such as network 504.

Additionally, input/output devices 540 may include one or more input interfaces that may include a keyboard, keypad, mouse, microphone, touch sensor, touch screen, joystick, control buttons, scrolling buttons, cameras, neural interface, or any other device suitable to generate a signal and/or data defining a user interaction with the electronic device 506. By way of example and not limitation, the input/output devices 540 may include a display (e.g., holographic display, head-up display, protector, touch screen, liquid crystal display (LCD), etc.), speakers, haptic interfaces, or the like.

In at least one example, a display device of the electronic device 506 may include a hardware display surface that may be configured to allow for a real-world view of an object through the hardware display surface while also providing a rendered display of computer generated content or scenes. The hardware display surface may include one or more components, such as a projector, screen, or other suitable components for producing a display of an object and/or data. In some configurations, the hardware display surface may be configured to cover at least one eye of a user. In one illustrative example, the hardware display surface may include a screen configured to cover both eyes of a user. The hardware display surface may render or cause the display of one or more images for generating a view or a stereoscopic image of one or more computer generated virtual objects. For illustrative purposes, an object can be an item, data, device, person, place, or any type of entity. In at least one example, an object can be associated with a function or a feature associated with an application. Some configurations may enable the electronic device 506 to graphically associate holographic user interfaces and other graphical elements with an object seen through a hardware display surface or rendered objects displayed on the hardware display surface of the electronic device 506.

A hardware display surface of the electronic device 506 may be configured to allow the individual 508 to view objects from different environments. In some configurations, the hardware display surface may display a rendering of a computer generated virtual object. In addition, some configurations of the hardware display surface may allow the individual 508 to see through selectable sections of the hardware display surface having a controllable level of transparency, enabling the individual 508 to view objects in his or her surrounding environment. For illustrative purposes, a perspective of the individual 508 looking at objects through the hardware display surface may be referred to herein as a "real-world view" of an object or a "real-world view of a physical object." Computer generated renderings of objects and/or data may be displayed in, around, or near the selected portions of the hardware display surface enabling the individual 508 to view the computer generated renderings along with real-world views of objects observed through the selected portions of the hardware display surface.

Some configurations described herein provide both a "see through display" and an "augmented reality display." For illustrative purposes, the "see through display" may include a transparent lens that may have content displayed on it. The "augmented reality display" may include an opaque display that is configured to display content over a rendering of an image, which may be from any source, such as a video feed from a camera used to capture images of an environment. For illustrative purposes, some examples described herein describe a display of rendered content over a display of an image. In addition, some examples described herein describe techniques that display rendered content over a "see through display" enabling a user to see a real-world view of an object with the content. It can be appreciated that the examples of the techniques described herein can apply to a "see through display," an "augmented reality display," or variations and combinations thereof. For illustrative purposes, devices configured to enable a "see through display," "augmented reality display," or combinations thereof are referred to herein as devices that are capable of providing a "mixed environment" or "mixed reality scene."

As explained previously, the computer-readable storage media 538 may store a gaze tracking module 542 that is executable by the processor 536 to determine a gaze path of the individual 508. In some cases, the gaze path may be determined based on one or more images of the individual 508. For example, the gaze path of the individual 508 based at least partly on images of at least one eye of the individual 508. The computer-readable storage media 538 also stores an object request module 544 that includes instructions that may be executable by the processor 536 to determine that the individual 508 is providing a request to identify an object. In some cases, the object request module 544 may analyze visual data of the individual 508, audible data of the individual 508, or both to determine that the individual 508 is requesting the identification of an object.

Further, the object response module 546 may include computer-readable instructions that are executable by the processor 536 to provide an identifier of an object to the individual 508. In particular, the object response module 546 may cause an identifier of an object received from the computing device 502 to be displayed on a display screen of the electronic device 506. In other situations, the object response module 546 may project an identifier of an object received from the computing device into a scene that includes the individual 508. In additional scenarios, the object response module 546 may provide audio output via one or more of the output devices of the electronic device 506 that includes an identifier received from the computing device 502. Also, the object response module 546 may perform operations to identify an object when an identifier has been provided for an incorrect object. For example, the object response module 546 may alter an appearance of one or more other objects included in a scene to highlight the object and obtain feedback from the individual 508 to determine if one of the highlighted objects is the correct object. In some cases, the object response module 546 may cause the electronic device 506 to project a mesh onto objects in a scene. In other cases, the object response module 546 may cause the electronic device 508 to cause objects to glow, cause objects to change color, to project a symbol onto or around objects, or combinations thereof.

In some implementations, at least a portion of the operations performed by the gaze tracking module 542 may include operations performed by the gaze tracking data module 514, at least a portion of the operations performed by the object request module 544 may include operations performed by the identification request module 516, at least a portion of the operations performed by the object response module 546 may include operations performed by the identification response module 526, or combinations thereof.

Figure 6:
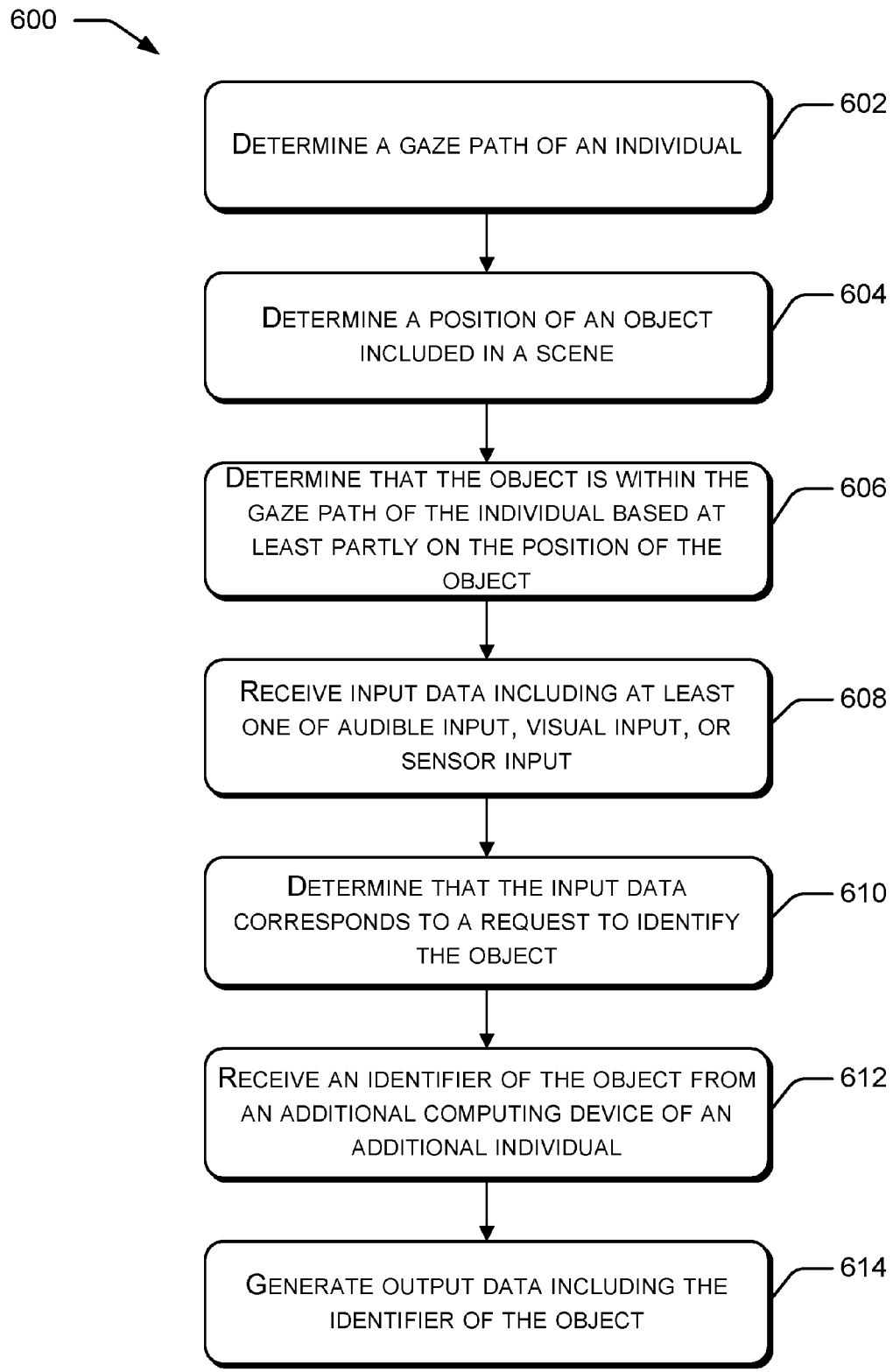
FIG. 6 is a flowchart of a first example process to identify objects using gaze tracking techniques.
Figure 7:
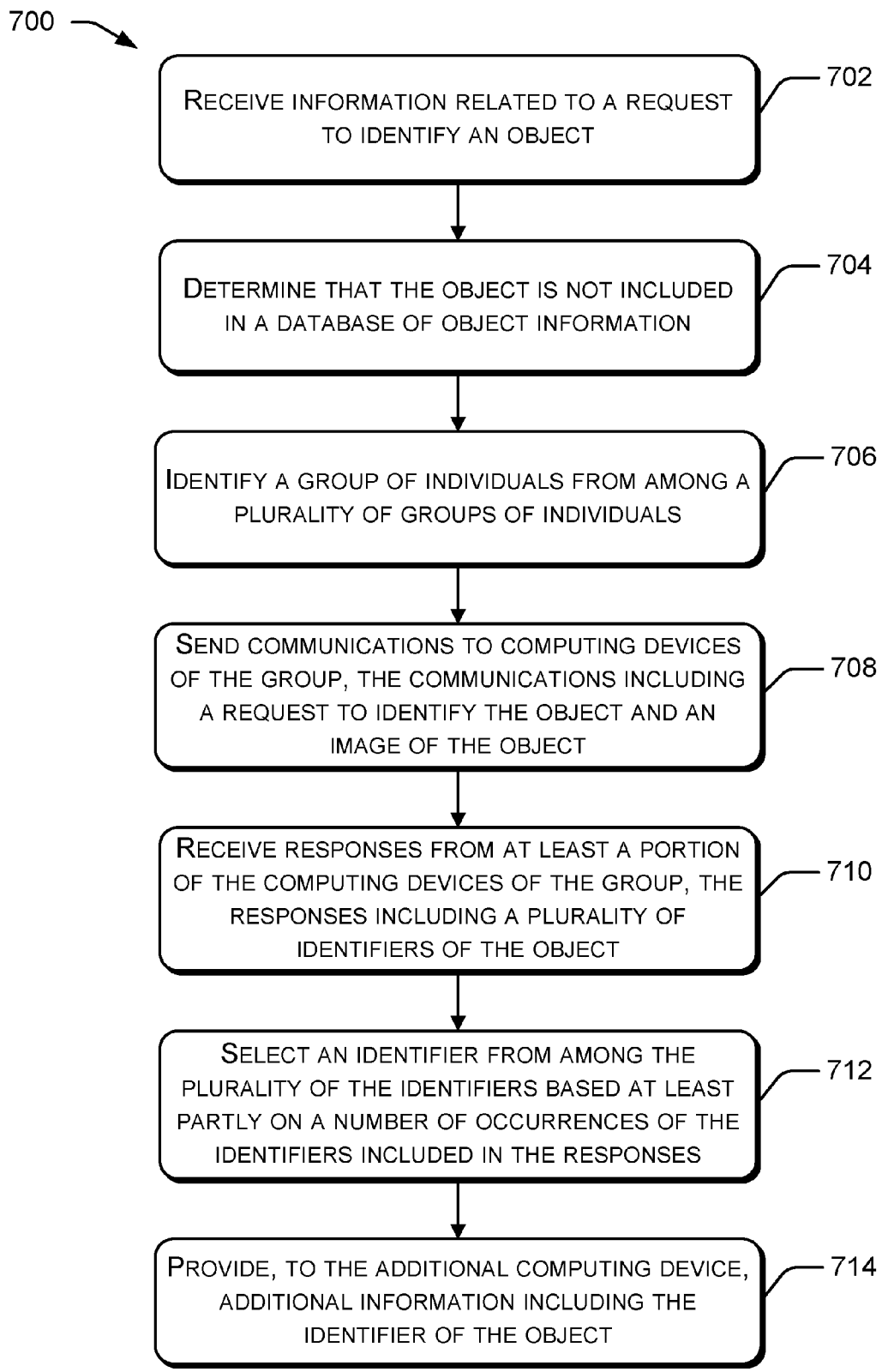
FIG. 7 is a flowchart of a second example process to identify objects using gaze tracking techniques.

In the flow diagrams of FIGS. 6 and 7, each block represents one or more operations that may be implemented in hardware, software, or a combination thereof. In the context of software, the blocks represent computer-executable instructions that, when executed by one or more processors, cause the processors to perform the recited operations. Generally, computer-executable instructions include routines, programs, objects, modules, components, data structures, and the like that perform particular functions or implement particular abstract data types. The order in which the blocks are described is not intended to be construed as a limitation, and any number of the described operations may be combined in any order and/or in parallel to implement the processes. For discussion purposes, the processes 600 and 700 may be described with reference to FIG. 1, 2, 3, 4, or 5 as described above, although other models, frameworks, systems and environments may implement these processes.

FIG. 6 is a flowchart of a first example process 600 to identify objects using gaze tracking techniques. At 602, the process 600 includes determining a gaze path of an individual. In some cases, the gaze path of the individual may be determined by capturing images of at least one eye of the individual and using the images to determine the position of one or more eyes of the individual. The position of at least one eye of the individual may be used to determine the gaze of the individual. The gaze path of the individual may be determined by a wearable computing device of the individual. In these situations, the wearable computing device may capture images of the position of at least one eye of the individual and analyze the images to determine the gaze path of the individual. In other implementations, the gaze path of the individual may be determined by a computing device located remotely from a wearable computing device of the individual. In situations where the gaze is determined remotely, the wearable computing device may capture images of at least one eye of the individual and send the images to a remote server computing device. The remote server computing device may analyze the images to determine the gaze of the individual and send information back to the wearable computing device that indicates the gaze path of the individual.

At 604, the process 600 includes determining a position of an object included in a scene. The position of the object may be determined based on images of the scene. For example, one or more cameras may capture images of a scene and determine distances between objects in the scene relative to the position of the one or more cameras. The distances may be used to determine the positions of the object included in the scene. The position of the object may also be determined by a wearable computing device of the individual or determined by a remotely located server computing device. In scenarios where the position of the object is determined by the wearable computing device, the wearable computing device may capture image of the scene and determine the positions of objects in the scene based on the images of the scene. In implementations where a remotely located server computing device determines the position of the object, the wearable computing device may capture images of the scene and send the images of the scene to the remote server computing device. The server computing device may analyze the images to determine the position of the object and send an indication to the wearable computing device indicating the position of the object.

In some cases, a computing device may generate at least a portion of the scene. The computer-generated portion of the scene may be projected into the scene by the computing device. In other implementations, the computer-generated portion of the scene may be displayed via a display device of the computing device. In addition, at least a portion of the scene may include a real-world scene and the object may be a tangible, physical object included in the real-world scene.

At 606, the process 600 includes determining that the object is within the gaze path of the individual based at least partly on the position of the object. In some implementations, a computing device may determine that the locations in the scene corresponding to the gaze path of the individual overlap with a position of the object in the scene. In this way, a gaze target may be identified.

At 608, the process 600 includes receiving input data including at least one of audible input, visual input, or sensor input and at 610, the process 600 includes determining that the input data corresponds to a request to identify the object. The audible data may include words, sounds, or both; the visual data may include a gesture; and the sensor input may include an electroencephalogram (EEG) pattern. Determining that the input data corresponds to a request to identify an object may include analyzing the input data with respect to information that has been predetermined to correspond to requests to identify objects. For example, certain words and/or sounds may be predetermined to correspond to a request to identify an object. In another example, particular gestures may be predetermined to correspond to a request to identify an object. In an additional example, particular EEG patterns may correspond to a request to identify an object. Accordingly, determining that the input data corresponds to a request to identify the object may include identifying similarities between at least one of the audible data, the visual data, or the sensor data with respect to at least one of predetermined sounds, predetermined words, predetermined gestures, or predetermined EEG patterns.

At 612, the process 600 includes receiving an identifier of the object from an additional computing device of an additional individual. The identifier may be provided by an individual included in a group of individuals that received requests to identify the object. In particular implementations, a computing system may determine that the object the individual is requesting to identify is not included in a data store storing a database of object information. The computing system may determine whether an object is included in the database of object information by comparing characteristics of the object, a context of the scene that includes the object, or both, with the characteristics of objects included in the database of object information, with contexts of objects included in the database of object information, or both. The characteristics of the object may be determined based on images of the object. The context of the object may be determined by identifying characteristics of the scene of the object based on images of the scene. In situations where characteristics and context of an object included in the database of object information do not correspond with the characteristics and context of the object that the individual is requesting to identify, the computing system may determine that the object is absent from the database of object information. In these situations, the computing system may identify a group of individuals to communicate with to identify the object. For example, the computing system may send communications including a request to identify the object to the group of individuals and at least one member of the group may send the identifier of the object to the computing system or to a computing device of the individual.

At 614, the process 600 includes generating output data including the identifier of the object. The output data may include at least one of audible output or visual output. Visual output may be displayed on a display device or projected into the scene. Audible output may be provided via one or more speakers of a computing device, one or more speakers included in the scene, or both.

In some cases, the identifier may be associated with the wrong object. That is, the object for which the identifier was provided may not have been the object that the individual was requesting to be identified. In these situations, a computing system may receive input from the individual indicating that the wrong object has been identified. The computing system may project an image of a mesh or a symbol onto different objects in the scene in an attempt to determine the correct object that the individual is requesting to be identified. The computing system may receive further input from the individual indicating another object to be identified in response to the mesh or symbol being projected onto the correct object.

FIG. 7 is a flowchart of a second example process 700 to identify objects using gaze tracking techniques. At 702, the process 700 includes receiving information related to a request to identify an object. The request may be received from a computing device of an individual. In some cases, the computing device of the individual may provide information to a computing system to determine that a request to identify an object has been provided. For example, the computing system may receive data indicating words, sounds, gestures, physiological data, or combinations thereof, and determine that the data corresponds to predetermined words, sounds, gestures, physiological data, or combinations thereof, that are associated with requests to identify objects.

In addition, at 704, the process 700 includes determining that the object is absent from a database of object information. In particular, a computing system may perform comparisons between features of an image of the object with features of images of a plurality of objects included in the database of object information. Additionally, the computing system may determine similarity scores for the image and individual objects of the plurality of objects included in the database of object information. In situations where the computing system determines that each of the similarity scores is below a threshold, the computing system may determine that the object is absent from the database of object information.

At 706, the process 700 includes identifying a group of individuals from among a plurality of groups of individuals. In some cases, the group may be identified based at least partly on a category associated with the object and a category associated with the group. For example, a computing system may determine a plurality of characteristics of the object based at least partly on one or more images of the object and then determine a category of the object based at least partly on the plurality of characteristics of the object. The computing system may then determine that the category of the object corresponds with an additional category associated with the group and select the group based at least partly on the category of the object corresponding with the additional category associated with the group.

At 708, the process 700 may include sending communications including a request to identify the object and an image of the object to computing devices of the individuals included in the group. In particular implementations, the communications may include an image of simply the object to be identified. In other situations, the communications may include an image that includes the object and other features included in a scene where the object is located. In some implementations, the computing system may filter an image of a scene by removing features of the scene. For example, the computing system may identify one or more features of the scene that are different from the object and remove at least a portion of the one or more features from the image to produce a modified image, where the modified image includes the object. To illustrate, the computing system may remove features from the image according to a privacy filter that removes at least one of personal information or inappropriate information from images. The communications sent to the computing devices of the group may include the modified image.

At 710, the process 700 includes receiving responses from at least a portion of the computing devices of the group. The responses may include a plurality of identifiers of the object. Further, at 712, the process 700 includes selecting an identifier from among the plurality of the identifiers based at least partly on a number of occurrences of the identifier in the responses. In particular implementations, a computing system may determine a number of responses associated with each identifier of the plurality of identifiers and determine a ranking of the plurality of responses based at least partly on the number of responses for each identifier. Based on the ranking, the computing system may determine the identifier that is associated with the greatest number of responses. Subsequently, at 714, the process 700 includes providing additional information to a computing device of the individual that includes the identifier of the object.

Figure 8A:
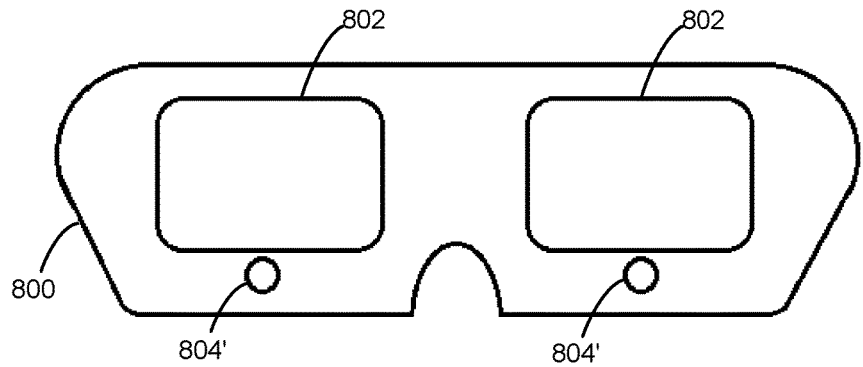
FIG. 8A-FIG. 8C illustrate example details of identifying gaze targets by tracking gaze of an individual.

Referring now to FIGS. 8A-8C, 9A-9F, 10A-10F, and 11 the following sections describes techniques for identifying a gaze target. The techniques are described in the context of a head-mounted computing device having a user facing gaze tracking camera. However, the techniques described in these sections may also be applied to other types of computing devices having a user facing camera for gaze tracking (e.g., computer with a web camera, a tablet or smartphone with user-facing camera, a game console with user facing camera, etc.). FIG. 8A is back view of a device 800 (e.g., computing device 112) having one or more hardware display surfaces 802 and one or more sensors 804 and 804'. In at least one example, sensor(s) 804' are user facing and may be configured to track the position of at least one eye of a user. In addition, at least one other sensor 804 may be a scene-facing camera and may be directed toward a real-world object for generating image data of the real-world object. As will be described in more detail below, examples may process eye position data, image data, and other data to identify a gaze target that is a rendered object displayed on a hardware display surface 802 or a real-world object viewed through a transparent section of the hardware display surface 802. As will also be described below, examples described herein may also determine if the user is looking at a particular section of a hardware display surface 802, a particular part of a real-world object, or a particular part of a rendered object. Such information may be useful for determining gaze targets from gaze tracking data, where the gaze targets are the subject of requests for object identification.

In FIG. 8A, the device 800 comprises two of the user facing sensors 804' for generating data or a signal indicating the position or movement of at least one eye of a user. The sensors 804' may be in the form of a camera or another suitable device for tracking the position or movement of at least one eye of the user. The device 800 may also comprise at least one hardware display surface 802 for allowing a user to view one or more objects. The hardware display surface 802 may provide a view of a real-world object through the hardware display surface 802 as well as images of rendered objects that may be displayed on the hardware display surface 802, as described above.

Figure 8B:
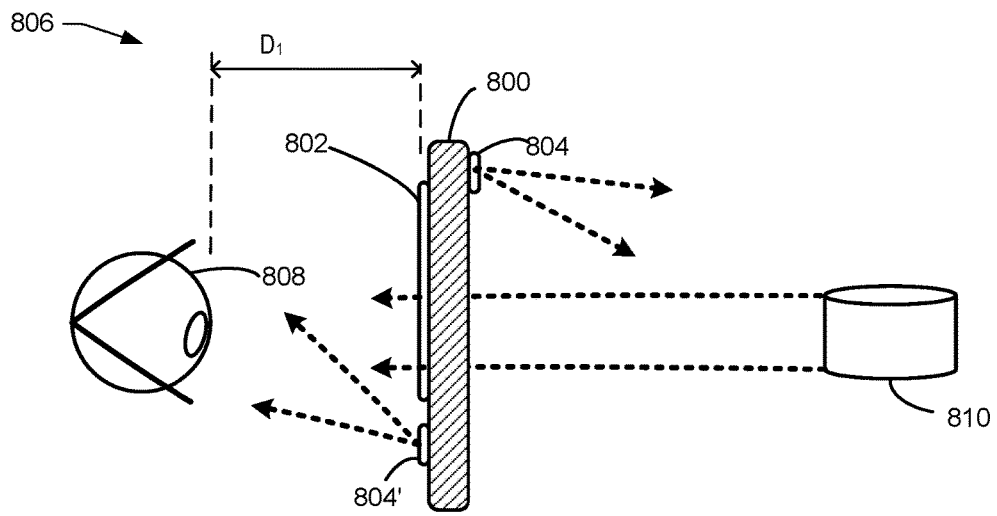

FIG. 8B is a side cutaway view 806 of the device 800 shown in FIG. 8A. FIG. 8B includes an eye 808 of a user looking through the hardware display surface 802. The hardware display surface 802 is configured to create transparent sections enabling a user to view objects through the hardware display surface 802. FIG. 8B shows an example arrangement where a real-world object 810 is aligned with a transparent section of the hardware display surface 802 allowing the user to view the real-world object 810 through the hardware display surface 802. The hardware display surface 802 may display one or more rendered objects. The device 800 also comprises at least one sensor 804' directed toward at least one eye 808 of the user.

Figure 8C:
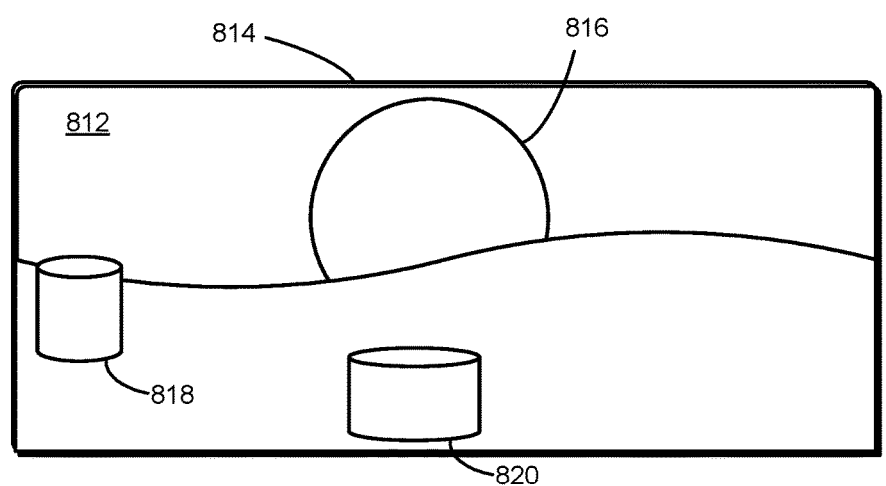

FIG. 8C illustrates an example scene or view 812 that may be observed by a user via the hardware display surface 802. The thick double line 814 illustrates the boundary of the hardware display surface 802. In this illustrative example, the scene or view 812 includes a real-world object 816, a first rendered object 818, and a second rendered object 820 that are displayed on the hardware display surface 802. The real-world object 816 is viewed through the hardware display surface 802.

In a non-limiting example described above, a user may determine that the scene 812 includes an object that the user is unable to identify, such as the second rendered object 818. For instance, the user may provide an audible expression and/or a gesture to indicate that the user is requesting to identify the second rendered object 818. In a particular example, the user may point to the second rendered object and say "What is that?" The device 800 may perform at least a portion of the operations to provide a response to the request of the user. Additionally, the device 800 may communicate with one or more additional computing devices to obtain a response to the request. Upon determining an identifier associated with the second rendered object 818, the device 800 may provide output indicating the identifier of the second rendered object 818. To illustrate, the device 800 may provide audible output, visual output, or both, indicating the identifier of the second rendered object 818.

To facilitate aspects of such an example, the device 800 may utilize one or more techniques for calibrating the device 800. The following section, in conjunction with FIGS. 9A-9F, describes aspects of a technique for obtaining calibration data. A subsequent section, in conjunction with FIG. 10A-FIG. 10F, describes aspects of an example scenario where a device 800 processes the calibration data and other data to identify a gaze target.

A device 800 may be calibrated in a number of ways. In one example, a device 800 may utilize the display of a number of graphical elements at predetermined locations. As the graphical elements are displayed, the device 800 may prompt the user to look at a particular graphical element and provide an input to verify that the user is looking at the particular graphical element. When the user verifies that he or she is looking at the particular graphical element, sensor(s) 804' may generate eye position data defining a position of at least one eye. The eye position data may be stored in a data structure in memory in response to receiving the verification from the user.

Figure 9A:
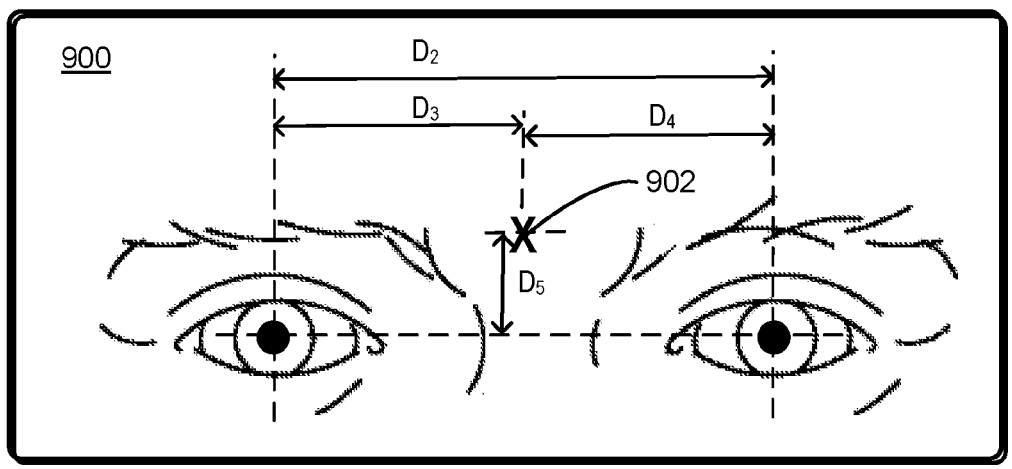
FIG. 9A-FIG. 9F describe example techniques for obtaining calibration data for gaze tracking.

FIG. 9A illustrates an example view 900 that may be captured by the sensors 804' of the device 800. From such a perspective, the device 800 may determine one or more values that define the position of at least one eye 808 of the user. In one illustrative example, the values may include a second value (D2) indicating a distance between a user's eyes and a third value (D3), fourth value (D4), and a fifth value (D5) indicating a distance between at least one eye of the user and a reference point 902. It may be appreciated that by the use of one or more image processing technologies, one or more aspects of an eye, such as the pupil, may be identified and utilized to determine an eye position.

In addition, by the use of one or more suitable technologies, a reference point 902 may be selected. A reference point 902 may be based on a feature of the user, e.g., a tip of a nose, an eyebrow, a beauty mark, or a reference point 902 may be in an arbitrary location. In the example of FIG. 9A, a point between the user's eyes is used as a reference point 902. This example reference point 902 is provided for illustrative purposes and is not to be construed as limiting. It may be appreciated that the reference point 902 may be in any suitable location, which may be based on an identifiable feature or characteristic of a user or any object.

Figure 9B:
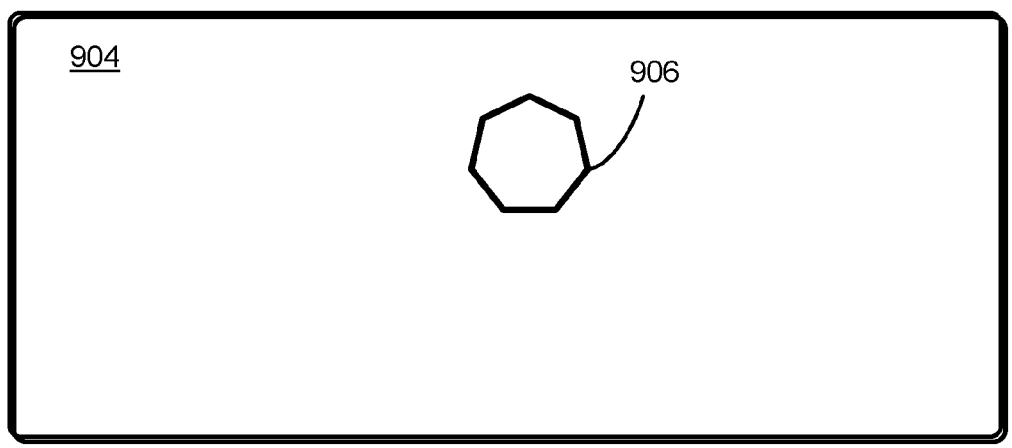

As described above, the device 800 may generate a number of graphical elements at predetermined locations of the hardware display surface 802. As the graphical elements are displayed on the hardware display surface 802, the device 800 may prompt the user to look at the graphical elements and provide an input to verify that the user is looking at the graphical elements. FIG. 9B illustrates an example view 904 of a graphical element 906 that may be generated by the device 800 to facilitate the calibration process. In this example, the device 800 generates a rendering of a graphical element 906 in the center of the viewing area. While the graphical element 906 is displayed, the device 800 may generate a prompt for the user to verify that he or she is looking at the graphical element 906. The prompt, as well as a user response to the prompt, may include a gesture, voice command, or other suitable types of input.

When the device 800 verifies that the user is looking at the graphical element 906, the device 800 may record one or more values indicating the position and/or the movement of at least one eye 808 of the user. For instance, one or more values described above and shown in FIG. 8B and FIG. 9A may be stored in a data structure in memory. It may be appreciated that any suitable value or a combination of values may be stored and utilized, including but not limited to, the first value (D1) indicating the distance between the sensors 804' and at least one eye 808 of a user, the second value (D2) indicating the distance between the eyes of a user, and other values (D3, D4, and D5) indicating the distance between at least one eye 808 and a reference point 902. These values are provided for illustrative purposes and are not to be construed as limiting. It may be appreciated that such values, subsets of such values, and other values of other measurements may be utilized in determining the movement and/or the position of one or more eyes of a user.

Figure 9C:
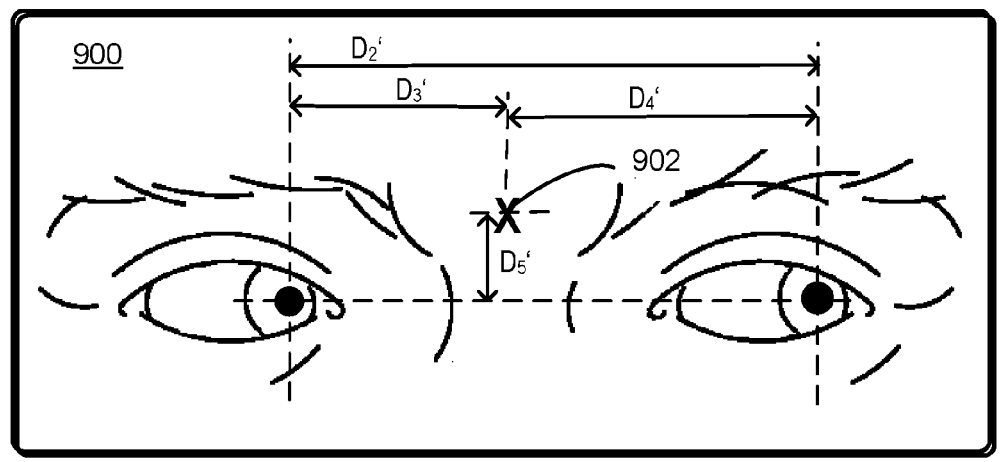
Figure 9D:
Figure 9E:
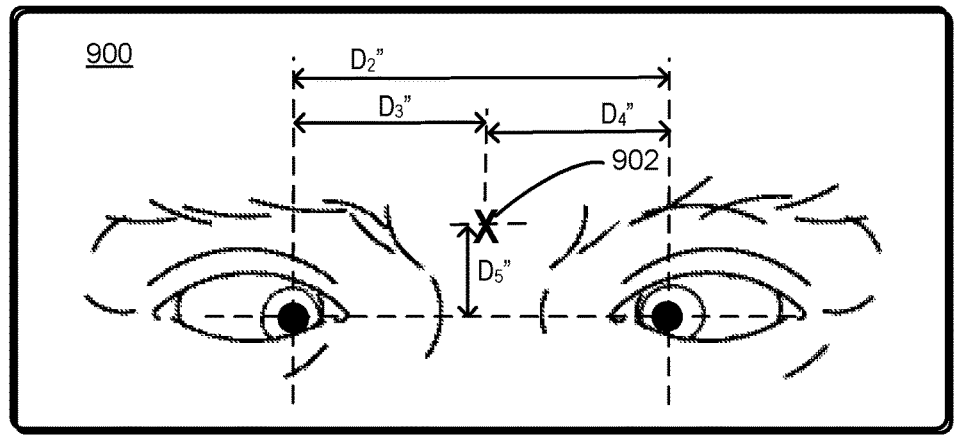
Figure 9F:
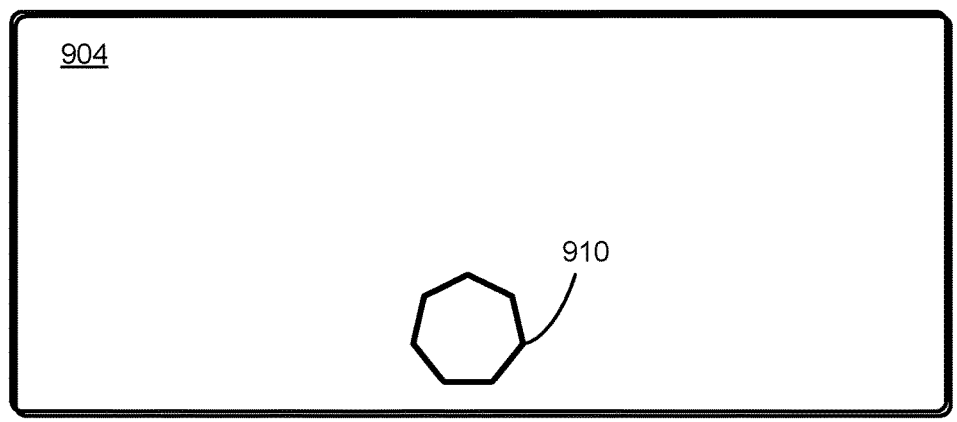

Other sets of values may be measured during the display of other graphical elements displayed in various positions. For example, as shown in FIG. 9C, a second set of values (D2', D3', D4', and D5') may be measured when a second graphical element 908 is displayed, as shown in FIG. 9D. As shown in FIG. 9E, a third set of values (D2", D3", D4", and D5") may be measured when a third graphical element 910 is displayed, as shown in FIG. 9F.

These example measurements and the locations of the graphical elements are provided for illustrative purposes. It may be appreciated that any number of graphical elements may be placed at different locations to obtain measurements that may be used to calibrate a device 800. For example, the device 800 may sequentially display a graphical element at pre-determined locations of the view 904, such as each corner of the view 904. As may be appreciated, more or fewer graphical elements may be used in the calibration process.

The values that indicate the position of at least one eye 808 at each pre-determined location may be used to generate calibration data. The calibration data may be configured to correlate the sets of eye position data with data identifying the positions of the graphical elements.

Any known technique suitable for generating calibration data may be used. It may be appreciated that the generation of calibration data may include extrapolation, projection and/or estimation technologies that may project correlations between sets of eye position data and various sections of a hardware display surface 802 and/or pixels of a hardware display surface 802. These examples are provided for illustrative purposes and are not to be construed as limiting, and the values and/or calibration data may be obtained in other ways, including receiving such calibration data from one or more remote resources.

Once the calibration data is generated or obtained, such data and other data may be utilized by the device 800 to determine if a user is looking at a particular gaze target, which may include a part of a hardware display surface 802, a rendered object, part of a rendered object, a real-world object, or part of a real-world object. FIGS. 10A-10F describe aspects of an example scenario where the device 800 having at least one sensor 804' is used to track the movement of at least one eye 808 of a user to identify a gaze target.

Figure 10A:
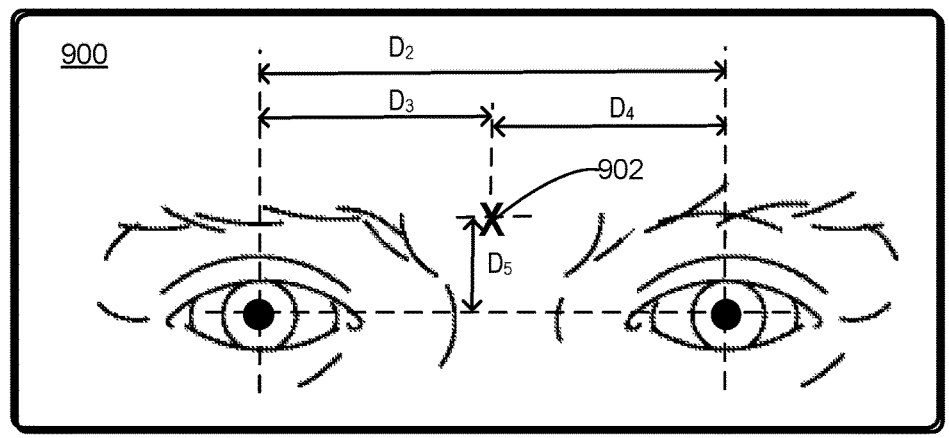
FIG. 10A-FIG. 10F describe example techniques for processing calibration data and other data to identify a gaze target.
Figure 10B:
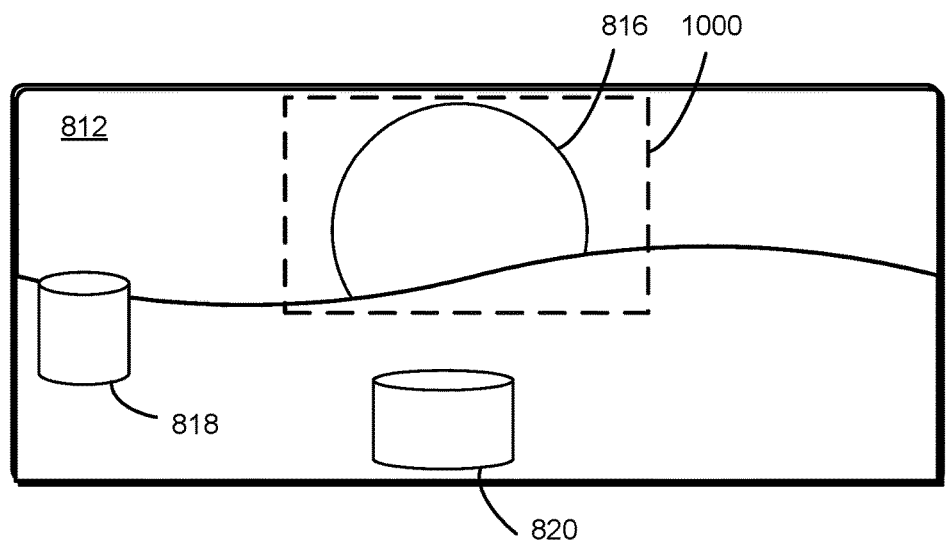

Referring now to FIG. 10A and FIG. 10B, an example scenario showing the identification of a gaze target is shown and described. In this example, the user is looking at the example view 812. As summarized above with reference to FIG. 8C, the example view 812 comprises both a view of rendered objects (e.g., first rendered object 818 and second rendered object 820) on the hardware display surface 802 as well as a view of a real-world object 816 through the hardware display surface 802. While the user is looking at the view 812, the sensor(s) 804' may cause the generation of one or more measured values, such as the values shown in the FIG. 10A. In some examples, using any combination of suitable technologies, such values may be compared against the calibration data and/or other data to identify a gaze target. In this example, one or more values measured in the scenario depicted in FIG. 10A may be processed with the calibration data to determine that the user is looking at the real world object 816. In such an example, the one or more measured values shown in FIG. 10A may also be used to determine that the user is looking at a predetermined section of an interface, such as the first section 1000 of the hardware display surface 802 in FIG. 10B.

Figure 10C:
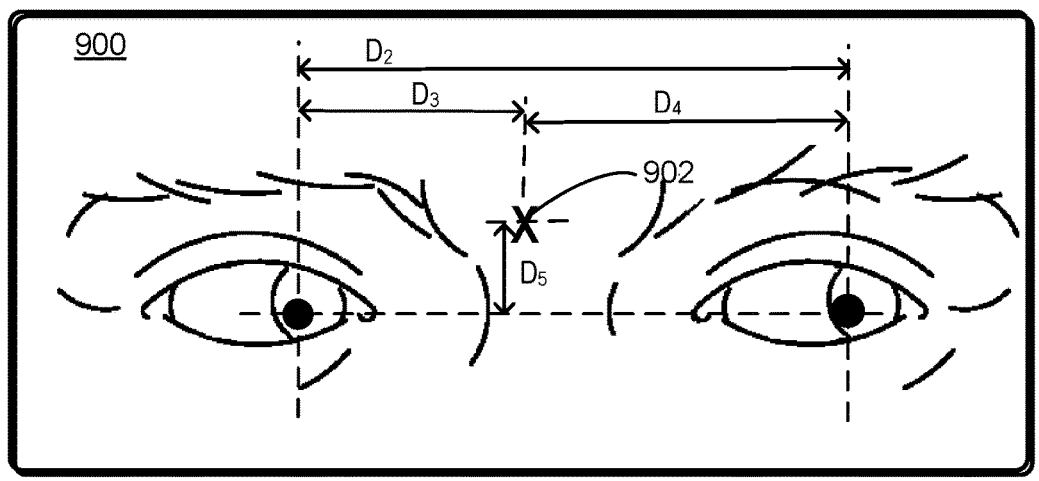
Figure 10D:
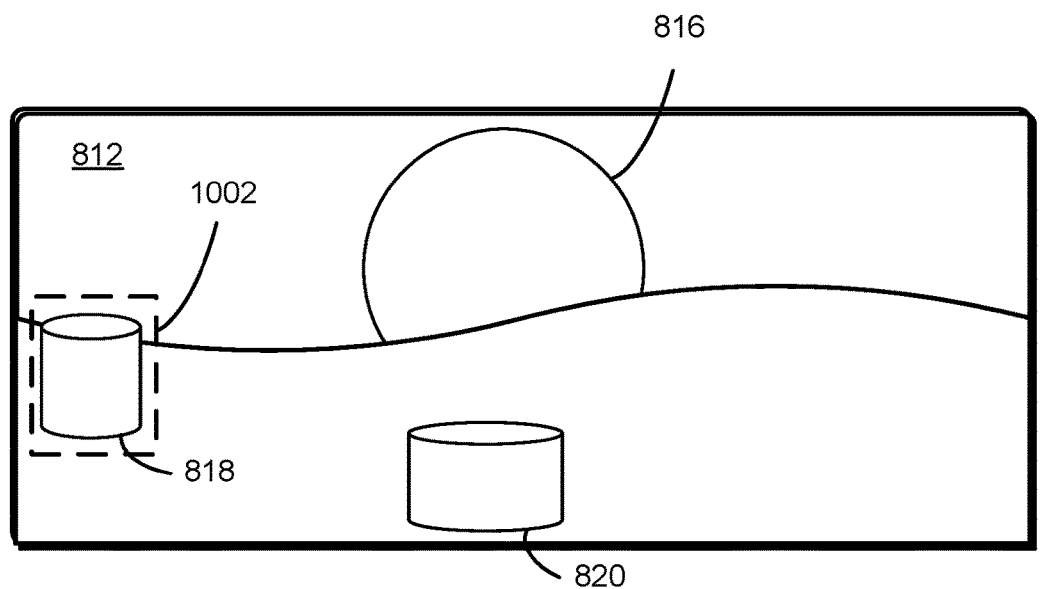

In continuing the present example, one or more values measured in the scenario depicted in FIG. 10C may be processed with the calibration data to determine that the user is looking at the second rendered object 818. In such an example, the one or more measured values shown in FIG. 10C may also be used to determine that the user is looking at a second section 1002 of the hardware display surface 802 in FIG. 10D.

Figure 10E:
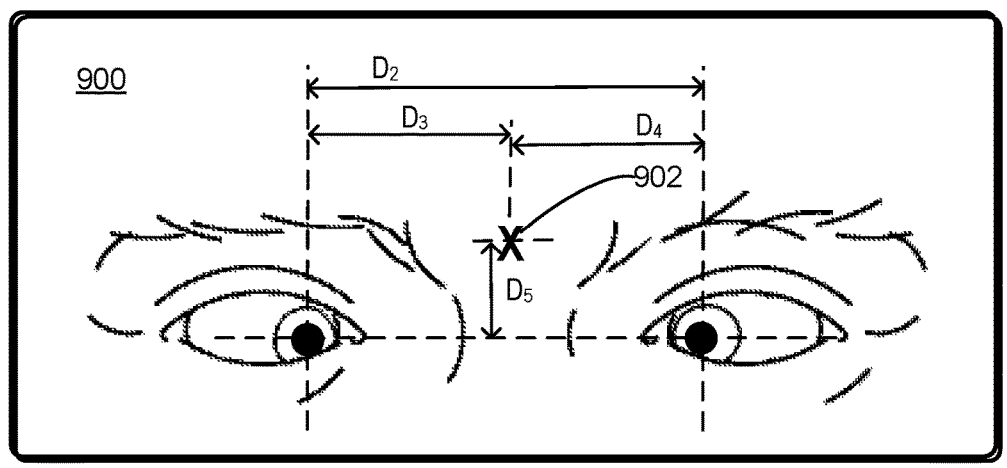
Figure 10F:
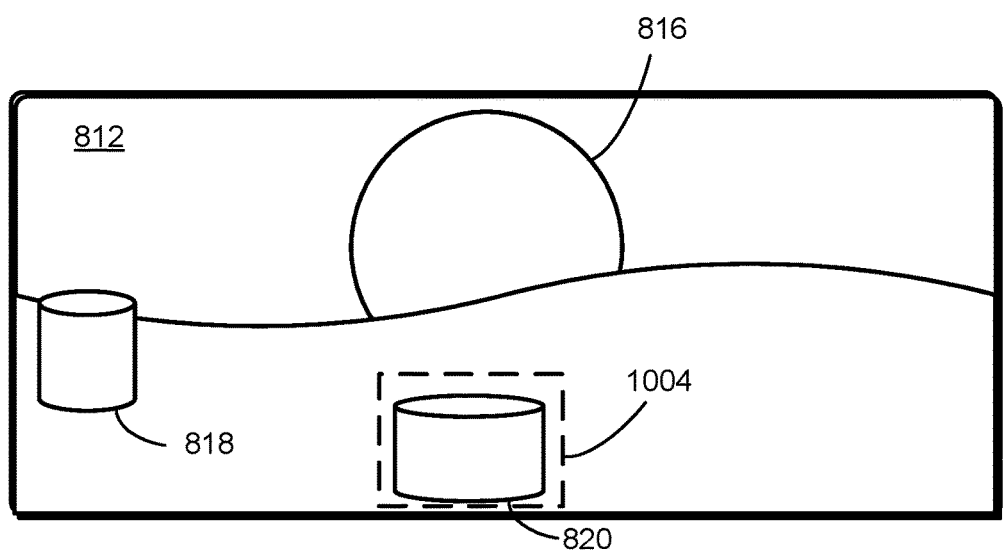

In continuing the present example, one or more values measured in the scenario depicted in FIG. 10E may be processed with the calibration data to determine that the user is looking at the second rendered object 820. In such an example, the one or more measured values shown in FIG. 10E may be processed with the calibration data to determine that the user is looking at a third section 1004 of the hardware display surface 802 in FIG. 10F.

In some examples, the device 800 may utilize data from a combination of resources to determine if a user is looking at the second rendered object 820 through the hardware display surface 802. As summarized above, a camera or other type of sensor 804 (FIG. 8A) mounted to the device 800 may be directed towards a user's field of view. Image data generated from the camera may be analyzed to determine if an object in the field of view is in a pre-determined position of an image of the image data. If an object is positioned within a pre-determined area of an image, such as the center of the image, a device may determine a gaze target processing such data with eye position data. Such data may be utilized to supplement other types of data, such as position data from a GPS and/or data generated from a compass or accelerometer, to assist device 800 to determine a gaze direction, e.g., left, right, up, or down, and/or a gaze target.

Figure 11:
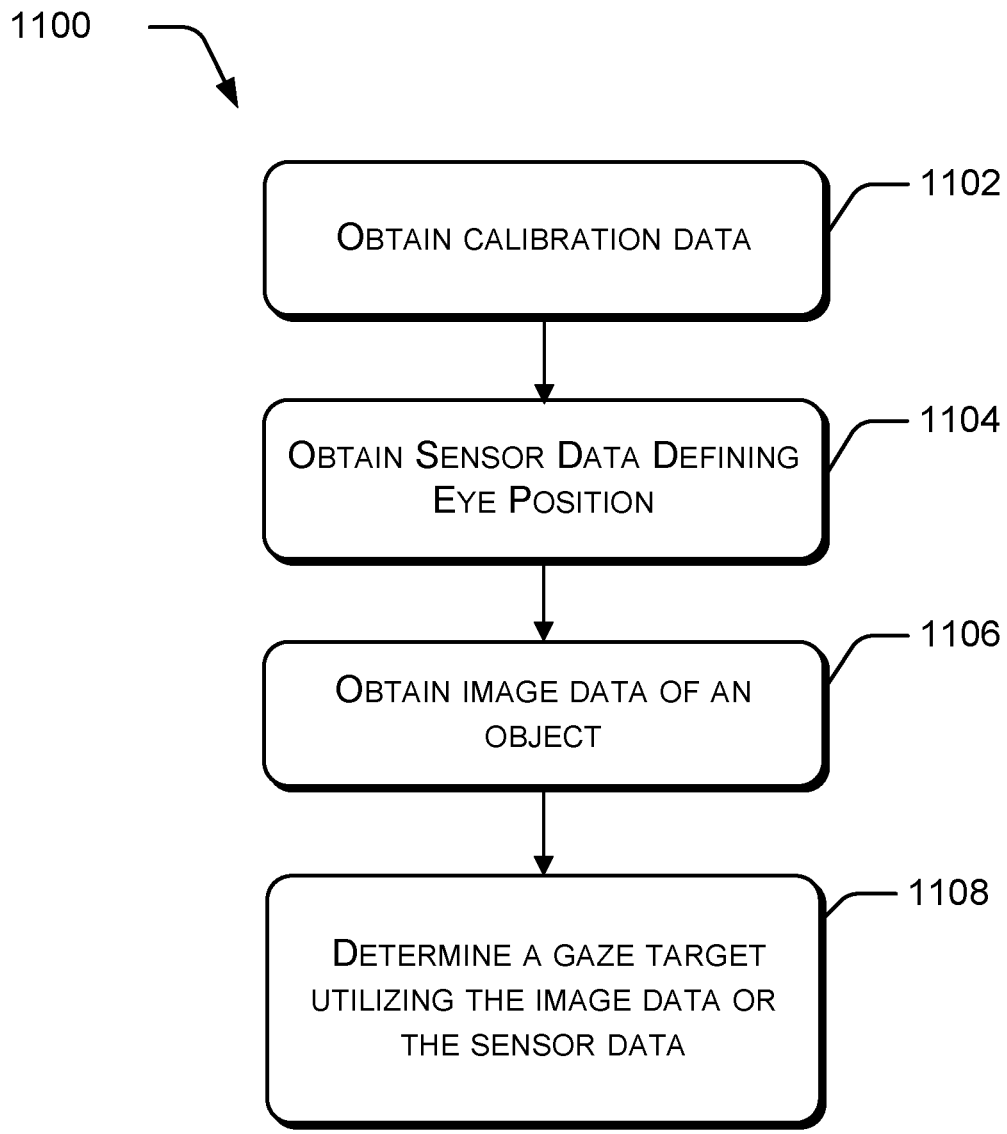
FIG. 11 is a flowchart illustrating aspects of an example process for determining a gaze target from gaze tracking data.

FIG. 11 is a flowchart illustrating aspects of an example process 1100 for determining a gaze target. In FIG. 11, the operations are described in the context of device 800 for convenience. However, the operations are applicable to other devices as well including, but not limited to, computing device 112.

Block 1102 illustrates obtaining calibration data. In at least one example, an operating system, an application, or another module, may obtain calibration data. The calibration data may be stored in a data structure in a computer readable storage medium for access at a later time. The calibration data may be generated by the device 800 or the calibration data may be received from a remote resource. In some examples, sensors of computing device 800 may be positioned to track the position of at least one eye of a user. The sensors may cause the generation of one or more values that correlate the position of at least one eye of a user with a particular section or position of a hardware display surface. Such examples may utilize an initialization process where the device 800 displays one or more graphical elements at pre-determined locations. During the display of the one or more graphical elements, one or more inputs from a user may indicate that they are looking at the one or more graphical elements. In response to the input, the device 800 may generate calibration data comprising the values that correlate the position of at least one eye of a user with data identifying a particular position or section of a hardware display surface.

Block 1104 illustrates obtaining sensor data indicating the position of at least one eye of the user. In at least one example, an operating system, an application, or another module, may obtain sensor data from one or more sensors. The sensor data may be stored in a data structure in a sensor data collection module(s) or elsewhere in a computer-readable storage medium for access at a later time. As summarized above, sensor(s) directed toward at least one eye of the user may cause the generation of sensor data (e.g., gaze tracking data) indicating the position of at least one eye of the user. The sensor data may be processed to generate data indicating a gaze direction of a user. As will be described below, the data indicating the gaze direction of the user may be processed with the calibration data to determine if the user is looking at a gaze target, which may include a rendered object displayed on a hardware display surface.

Block 1106 illustrates obtaining image data of an object. In at least one example, an operating system, an application, or another module associated with a computer-readable media, may obtain sensor data. The image data or other information about the object may be stored in a data structure in a sensor data collection module(s), or elsewhere in any computer readable storage medium for access at a later time. In some examples, a camera or other type of sensor mounted to or otherwise in communication with the computing device 800 may be directed towards a user's field of view. The camera or other type of sensor may cause the generation of image data, which may include one or more images of an object that is in the user's field of view. The image data may be in any suitable format and generated by any suitable sensor, which may include the use of a depth map sensor, camera, etc.

Block 1108 illustrates determining a gaze target utilizing the image data or the sensor data. In at least one example, an operating system, an application, or another module associated with a computer-readable media, may determine the gaze target. For instance, if the user is looking at a real-world view of the object through a hardware display surface 802, and the sensor directed towards the user's field of view may generate image data of the real-world object. The image data may be analyzed to determine if the object in the field of view is in a pre-determined position of an image of the image data. For example, if an object is positioned within a pre-determined area of an image, such as the center of the image, the computing device 800 may determine that the object is a gaze target. In another example, sensor data (e.g., gaze tracking data) indicating the position of at least one eye of the user may be processed with the calibration data and/or image data to determine if the user is looking at a rendered object displayed on the hardware display surface. Such an example may be used to determine that the rendered object displayed on a hardware display surface is a gaze target.

Figure 12:
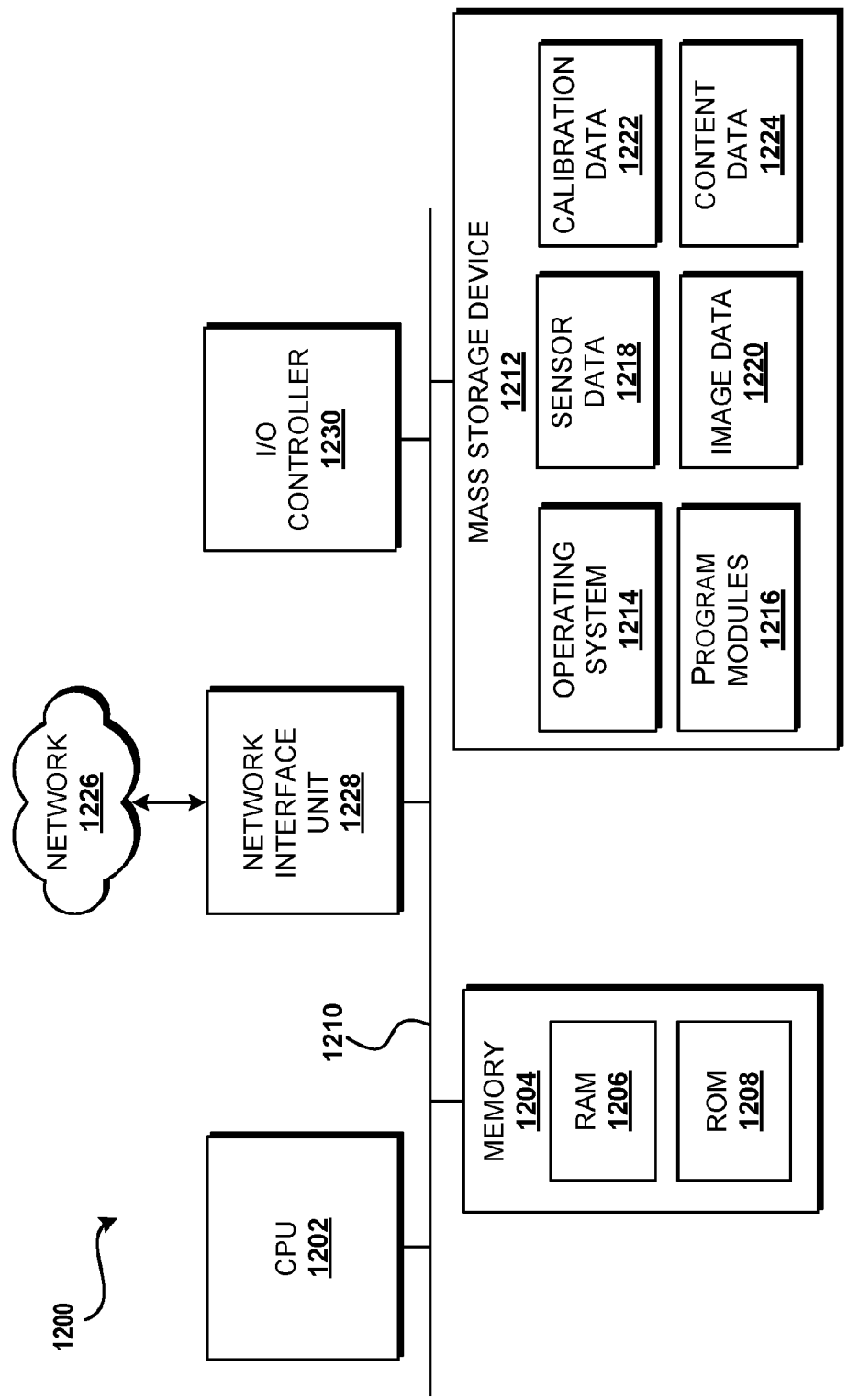
FIG. 12 is a schematic diagram illustrating an example computer architecture usable to implement aspects of identifying objects using gaze-tracking techniques.

FIG. 12 shows additional details of an example computer architecture 1200 for a computer, such as computing device 112, computing device 502, and/or electronic device 506, capable of executing the program components described above for utilizing gaze tracking techniques to identify an object. Thus, the computer architecture 1200 illustrated in FIG. 12 illustrates an architecture for a server computer, mobile phone, a PDA, a smart phone, a desktop computer, a netbook computer, a tablet computer, a laptop computer, and/or a wearable computer. The computer architecture 1200 is an example architecture that may be used to execute, in whole or in part, aspects of the software components presented herein.

The computer architecture 1200 illustrated in FIG. 12 includes a central processing unit 1202 ("CPU"), a system memory 1204, including a random access memory 1206 ("RAM") and a read-only memory ("ROM") 1208, and a system bus 1210 that couples the memory 1204 to the CPU 1202. A basic input/output system ("BIOS") containing the basic routines that help to transfer information between elements within the computer architecture 1200, such as during startup, is stored in the ROM 1208. The computer architecture 1200 further includes a mass storage device 1212 for storing an operating system 1214, programs, module(s) 1216 (e.g., the object identification system 118 of FIG. 1 and FIG. 2 and modules 514, 516, 518, 520, 522, 524, 526, 542, 544, and/or 546 of FIG. 5). Additionally, and/or alternatively, the mass storage device 1212 may store sensor data 1218, image data 1220 (e.g., photographs, computer generated images, object information about real and/or virtual objects in a scene, metadata about any of the foregoing, etc.), calibration data 1222, content data 1224 (e.g., computer generated images, videos, scenes, etc.), and the like, as described herein.

The mass storage device 1212 is connected to the CPU 1202 through a mass storage controller (not shown) connected to the bus 1210. The mass storage device 1212 and its associated computer-readable media provide non-volatile storage for the computer architecture 1200. Mass storage device 1212, memory 1204, computer-readable storage media 512, and computer-readable storage media 538 are examples of computer-readable media according to this disclosure. Although the description of computer-readable media contained herein refers to a mass storage device, such as a solid state drive, a hard disk or CD-ROM drive, it should be appreciated by those skilled in the art that computer-readable media may be any available computer storage media or communication media that may be accessed by the computer architecture 1200.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of communication media.

By way of example, and not limitation, computer storage media may include volatile and non-volatile, removable and non-removable media implemented in any method or technology for storage of information such as computer-readable instructions, data structures, program modules or other data. For example, computer storage media includes, but is not limited to, RAM, ROM, erasable programmable read-only memory ("EPROM"), electrically erasable programmable read-only memory ("EEPROM"), flash memory or other solid state memory technology, compact disc read-only memory ("CD-ROM"), digital versatile disks ("DVD"), high definition/density digital versatile/video disc ("HD-DVD"), BLU-RAY disc, or other optical storage, magnetic cassettes, magnetic tape, magnetic disk storage or other magnetic storage devices, or any other medium which may be used to store the desired information and which may be accessed by the computer architecture 1200. For purposes of the claims, the phrase "computer storage medium," "computer-readable storage medium," and variations thereof, does not include communication media.

According to various configurations, the computer architecture 1200 may operate in a networked environment using logical connections to remote computers through the network 1226 and/or another network (not shown). The computer architecture 1200 may connect to the network 1226 through a network interface unit 1228 connected to the bus 1210. It should be appreciated that the network interface unit 1228 also may be utilized to connect to other types of networks and remote computer systems. The computer architecture 1200 also may include an input/output controller 1230 for receiving and processing input from input device(s) or input interface(s), and to provide output to an output device or output interface.

It should be appreciated that the software components described herein may, when loaded into the CPU 1202 and executed, transform the CPU 1202 and the overall computer architecture 1200 from a general-purpose computing system into a special-purpose computing system customized to facilitate the functionality presented herein. The CPU 1202 may be constructed from any number of transistors or other discrete circuit elements, which may individually or collectively assume any number of states. More specifically, the CPU 1202 may operate as a finite-state machine, in response to executable instructions contained within the software modules described herein. These computer-executable instructions may transform the CPU 1202 by specifying how the CPU 1202 transitions between states, thereby transforming the transistors or other discrete hardware elements constituting the CPU 1202. In some examples, processor(s) 510 and/or processor(s) 536 may correspond to CPU 1202.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software described herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media described herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer architecture 1200 in order to store and execute the software components presented herein. It also should be appreciated that the computer architecture 1200 may include other types of computing entities, including hand-held computers, embedded computer systems, personal digital assistants, and other types of computing entities known to those skilled in the art. It is also contemplated that the computer architecture 1700 may not include all of the components shown in FIG. 12, may include other components that are not explicitly shown in FIG. 12, or may utilize an architecture completely different than that shown in FIG. 12.

Figure 13:
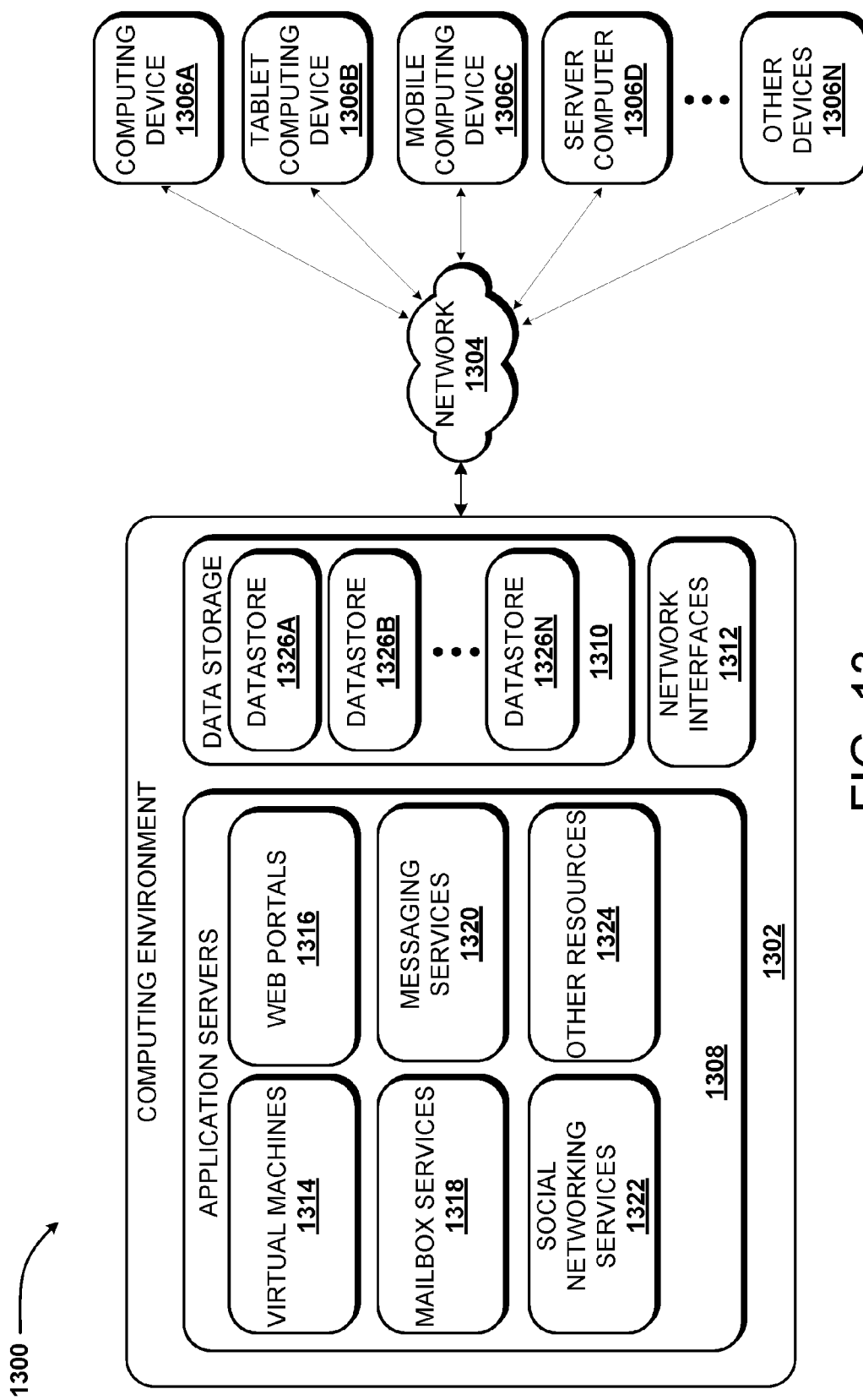
FIG. 13 is a schematic diagram illustrating an example distributed computing environment capable of implementing aspects of identifying objects using gaze-tracking techniques.

FIG. 13 depicts an example distributed computing environment 1300 capable of executing the software components described herein for implementing the identification of objects using gaze tracking techniques. Thus, the distributed computing environment 1300 illustrated in FIG. 13 may be utilized to execute any aspects of the software components presented herein to achieve aspects of the techniques described herein.

According to various implementations, the distributed computing environment 1300 includes a computing environment 1302 operating on, in communication with, or as part of a network 1304. In at least one example, at least some of computing environment 1300 may correspond to the electronic device 122, the computing device 502, and/or electronic device 506. The network 1304 may be or may include network(s) 504 described above with reference to FIG. 5. The network 1304 also may include various access networks. One or more client devices 1306A-1306N (hereinafter referred to collectively and/or generically as "clients 1306") may communicate with the computing environment 1302 via the network 1304 and/or other connections (not illustrated in FIG. 13). By way of example, computing devices 112 of FIG. 1 and FIG. 2 and electronic device 506 of FIG. 5 may correspond to one or more of client devices 1306A-1306Q (collectively referred to as "clients 1306"), where Q may be any integer greater than or equal to 1 depending on the desired architecture. In one illustrated configuration, the clients 1306 include a computing device 1306A such as a laptop computer, a desktop computer, or other computing device, a slate or tablet computing device ("tablet computing device") 1306B, a mobile computing device 1306C such as a mobile telephone, a smart phone, or other mobile computing device, a server computer 1306D, a wearable computer 1306E, and/or other devices 1306N. It should be understood that any number of clients 1306 may communicate with the computing environment 1302. Two example computing architectures for the clients 1306 are illustrated and described herein with reference to FIGS. 12 and 14. It should be understood that the illustrated clients 1306 and computing architectures illustrated and described herein are illustrative, and should not be construed as being limited in any way.

In the illustrated configuration, the computing environment 1302 includes application servers 1308, data storage 1310, and one or more network interfaces 1312. According to various implementations, the functionality of the application servers 1308 may be provided by one or more server computers that are executing as part of, or in communication with, the network 1304. In some examples, the computing environment 1302 may correspond to or be representative of the one or more computing devices 502 in FIG. 5, which are in communication with and accessible by the one or more computing devices 506 via the network(s) 504 and/or 1304.

In at least one example, the application servers 1308 may host various services, virtual machines, portals, and/or other resources. In the illustrated configuration, the application servers 1308 may host one or more virtual machines 1314 for executing applications or other functionality. According to various implementations, the virtual machines 1314 may execute one or more applications and/or software modules for implementing object identification using gaze tracking techniques. The application servers 1308 also host or provide access to one or more portals, link pages, Web sites, and/or other information ("Web portals") 1316. The Web portals 1316 may be used to communicate with one or more client computers. The application servers 1308 may include one or more mailbox services 1318.

According to various implementations, the application servers 1308 also include one or more mailbox messaging services 1320. The mailbox services 1318 and/or messaging services 1320 may include electronic mail ("email") services, various personal information management ("PIM") services (e.g., calendar services, contact management services, collaboration services, etc.), instant messaging services, chat services, forum services, and/or other communication services.

The application servers 1308 also may include one or more social networking services 1322. The social networking services 1322 may include various social networking services including, but not limited to, services for sharing or posting status updates, instant messages, links, photos, videos, and/or other information; services for commenting or displaying interest in articles, products, blogs, or other resources; and/or other services. In some configurations, the social networking services 1322 are provided by or include the FACEBOOK® social networking service, the LINKEDIN® professional networking service, the MYSPACE® social networking service, the FOURSQUARE® geographic networking service, the YAMMER® office colleague networking service, and the like. In other configurations, the social networking services 1322 are provided by other services, sites, and/or providers that may or may not be explicitly known as social networking providers. For example, some web sites allow users to interact with one another via email, chat services, and/or other means during various activities and/or contexts such as reading published articles, commenting on goods or services, publishing, collaboration, gaming, and the like. Examples of such services include, but are not limited to, the WINDOWS LIVE® service and the XBOX LIVE® service from Microsoft Corporation in Redmond, Wash. Other services are possible and are contemplated.

The social networking services 1322 also may include commenting, blogging, and/or micro blogging services. Examples of such services include, but are not limited to, the YELP® commenting service, the KUDZU® review service, the OFFICETALK® enterprise micro blogging service, the TWITTER® messaging service, the GOOGLE BUZZ® service, and/or other services. It should be appreciated that the above lists of services are not exhaustive and that numerous additional and/or alternative social networking services 1322 are not mentioned herein for the sake of brevity. As such, the above configurations are illustrative, and should not be construed as being limited in any way. According to various implementations, the social networking services 1322 may host one or more applications and/or software modules for providing the functionality described herein for providing contextually-aware location sharing services for computing devices. For instance, any one of the application servers 1308 may communicate or facilitate the functionality and features described herein. For instance, a social networking application, mail client, messaging client, a browser running on a phone or any other client 1806 may communicate with a social networking service 1322.

As shown in FIG. 13, the application servers 1308 also may host other services, applications, portals, and/or other resources ("other resources") 1324. The other resources 1324 may deploy a service-oriented architecture or any other client-server management software. It thus may be appreciated that the computing environment 1302 may provide integration of the gaze-based object identification concepts and technologies described herein with various mailbox, messaging, social networking, and/or other services or resources.

As mentioned above, the computing environment 1302 may include the data storage 1310. According to various implementations, the functionality of the data storage 1310 is provided by one or more databases operating on, or in communication with, the network 1304. The functionality of the data storage 1310 also may be provided by one or more server computers configured to host data for the computing environment 1302. The data storage 1310 may include, host, or provide one or more real or virtual containers 1326A-1326N (referred to collectively and/or generically as "containers 1326"). Although not illustrated in FIG. 13, the containers 1326 also may host or store data structures and/or algorithms for execution by one or more modules of remote computing devices (e.g., modules 514, 516, 518, 520, 522, 524, 526 of FIG. 5 and/or the object identification system 118 of FIG. 1 and FIG. 2). Aspects of the containers 1326 may be associated with a database program, file system and/or any program that stores data with secure access features. Aspects of the containers 1326 may also be implemented using products or services, such as ACTIVE DIRECTORY®, DKM®, ONEDRIVE®, DROPBOX® or GOOGLEDRIVE®.

The computing environment 1302 may communicate with, or be accessed by, the network interfaces 1312. The network interfaces 1312 may include various types of network hardware and software for supporting communications between two or more computing entities including, but not limited to, the clients 1306 and the application servers 1308. It should be appreciated that the network interfaces 1312 also may be utilized to connect to other types of networks and/or computer systems.

It should be understood that the distributed computing environment 1300 described herein may provide any aspects of the software elements described herein with any number of virtual computing resources and/or other distributed computing functionality that may be configured to execute any aspects of the software components described herein. According to various implementations of the concepts and technologies described herein, the distributed computing environment 1300 provides the software functionality described herein as a service to the clients 1306. It should be understood that the clients 1306 may include real or virtual machines including, but not limited to, server computers, web servers, personal computers, tablet computers, gaming consoles, smart televisions, mobile computing entities, smart phones, and/or other devices. As such, various configurations of the concepts and technologies described herein enable any device configured to access the distributed computing environment 1300 to utilize the functionality described herein for providing gaze-based authentication, among other aspects. In one specific example, as summarized above, techniques described herein may be implemented, at least in part, by a web browser application that may work in conjunction with the application servers 1308 of FIG. 13.

Figure 14:
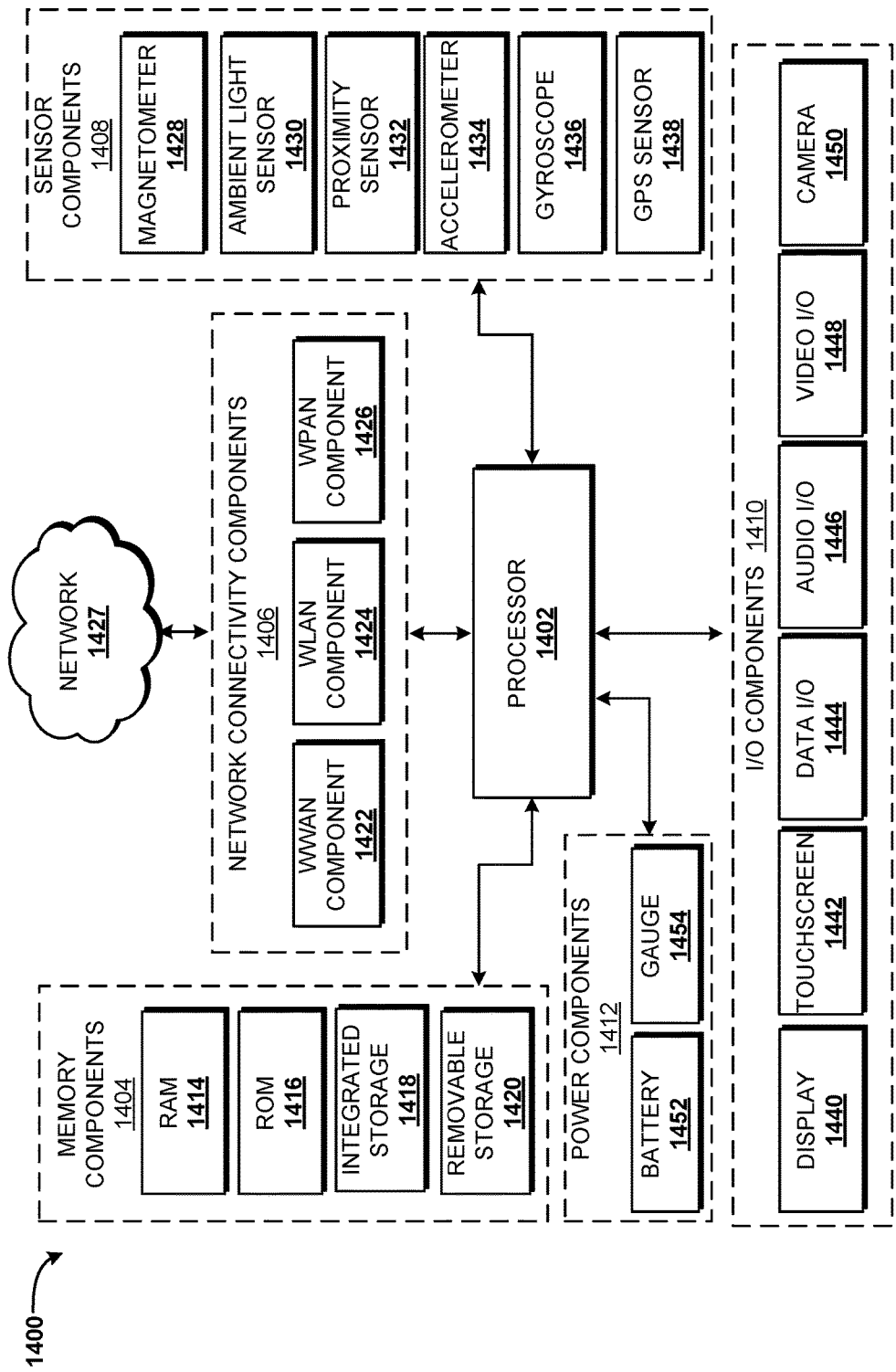
FIG. 14 is a schematic diagram illustrating another example computing device architecture usable to implement aspects of identifying objects using gaze-tracking techniques.

FIG. 14 is an illustrative computing device architecture 1400 for a computing device that is capable of executing various software components described which, in some examples, is usable to implement aspects of gaze-based object identification. The computing device architecture 1400 is applicable to computing entities that facilitate mobile computing due, in part, to form factor, wireless connectivity, and/or battery-powered operation. In some configurations, the computing entities include, but are not limited to, mobile telephones, tablet devices, slate devices, wearable devices, portable video game devices, and the like. Moreover, aspects of the computing device architecture 1400 may be applicable to traditional desktop computers, portable computers (e.g., laptops, notebooks, ultra-portables, and netbooks), server computers, and other computer systems. By way of example and not limitation, the computing device architecture 1400 is applicable to any of the clients shown in FIGS. 1, 2, 5, 12, and 13.

The computing device architecture 1400 illustrated in FIG. 14 includes a processor 1402, memory components 1404, network connectivity components 1406, sensor components 1408, input/output components 1410, and power components 1412. In the illustrated configuration, the processor 1402 is in communication with the memory components 1404, the network connectivity components 1406, the sensor components 1408, the input/output ("I/O") components 1410, and the power components 1412. Although no connections are shown between the individual components illustrated in FIG. 14, the components may interact to carry out device functions. In some configurations, the components are arranged so as to communicate via one or more busses (not shown).

The processor 1402 includes a central processing unit ("CPU") configured to process data, execute computer-executable instructions of one or more application programs, and communicate with other components of the computing device architecture 1400 in order to perform various functionality described herein. The processor 1402 may be utilized to execute aspects of the software components presented herein. In some examples, the processor 1402 may correspond to processor(s) 510, 536, and/or CPU 1202, as described above in reference to FIGS. 5 and 12.

In some configurations, the processor 1402 includes a graphics processing unit ("GPU") configured to accelerate operations performed by the CPU, including, but not limited to, operations performed by executing general-purpose scientific and/or engineering computing applications, as well as graphics-intensive computing applications such as high resolution video (e.g., 1080i, 1080p, and higher resolution), video games, three-dimensional ("3D") modeling applications, and the like. In some configurations, the processor 1402 is configured to communicate with a discrete GPU (not shown). In some examples, the processor 1402 may additionally or alternatively comprise a holographic processing unit (HPU) which is designed specifically to process and integrate data from multiple sensors of a head mounted computing device and to handle tasks such as spatial mapping, gesture recognition, and voice and speech recognition. In any case, the CPU, GPU, and/or HPU may be configured in accordance with a co-processing CPU/GPU/HPU computing model, wherein processing tasks are divided between the CPU, GPU, and/or HPU according to their respective strengths. For instance, the sequential part of an application may execute on the CPU, the computationally-intensive part is accelerated by the GPU, and certain specialized functions (e.g., spatial mapping, gesture recognition, and voice and speech recognition) may executed by an HPU.

In some configurations, the processor 1402 is, or is included in, a System-on-Chip ("SoC") along with one or more of the other components described herein below. For example, the SoC may include the processor 1402, a GPU, one or more of the network connectivity components 1406, and one or more of the sensor components 1408. In some configurations, the processor 1402 is fabricated, in part, utilizing a Package-on-Package ("PoP") integrated circuit packaging technique. The processor 1402 may be a single core or multi-core processor.

The processor 1402 may be created in accordance with an ARM architecture, available for license from ARM HOLDINGS of Cambridge, United Kingdom. Alternatively, the processor 1402 may be created in accordance with an x86 architecture, such as is available from INTEL CORPORATION of Mountain View, Calif. and others. In some configurations, the processor 1402 is a SNAPDRAGON SoC, available from QUALCOMM of San Diego, Calif., a TEGRA SoC, available from NVIDIA of Santa Clara, Calif., a HUMMINGBIRD SoC, available from SAMSUNG of Seoul, South Korea, an Open Multimedia Application Platform ("OMAP") SoC, available from TEXAS INSTRUMENTS of Dallas, Tex., a customized version of any of the above SoCs, or a proprietary SoC.

The memory components 1404 include a random access memory ("RAM") 1414, a read-only memory ("ROM") 1416, an integrated storage memory ("integrated storage") 1418, and a removable storage memory ("removable storage") 1420. In some configurations, the RAM 1414 or a portion thereof, the ROM 1416 or a portion thereof, and/or some combination the RAM 1414 and the ROM 1416 is integrated in the processor 1402. In some configurations, the ROM 1416 is configured to store a firmware, an operating system or a portion thereof (e.g., operating system kernel), and/or a bootloader to load an operating system kernel from the integrated storage 1418 and/or the removable storage 1420. In some examples, memory components 1404 may correspond to computer-readable storage media 512, computer-readable storage media 538, and/or memory 1204, as described above in reference to FIGS. 5 and 12, respectively.

The integrated storage 1418 may include a solid-state memory, a hard disk, or a combination of solid-state memory and a hard disk. The integrated storage 1418 may be soldered or otherwise connected to a logic board upon which the processor 1402 and other components described herein also may be connected. As such, the integrated storage 1418 is integrated in the computing device. The integrated storage 1418 is configured to store an operating system or portions thereof, application programs, data, and other software components described herein.

The removable storage 1420 may include a solid-state memory, a hard disk, or a combination of solid-state memory and a hard disk. In some configurations, the removable storage 1420 is provided in lieu of the integrated storage 1418. In other configurations, the removable storage 1420 is provided as additional optional storage. In some configurations, the removable storage 1420 is logically combined with the integrated storage 1418 such that the total available storage is made available as a total combined storage capacity. In some configurations, the total combined capacity of the integrated storage 1418 and the removable storage 1420 is shown to a user instead of separate storage capacities for the integrated storage 1418 and the removable storage 1420.

The removable storage 1420 is configured to be inserted into a removable storage memory slot (not shown) or other mechanism by which the removable storage 1420 is inserted and secured to facilitate a connection over which the removable storage 1420 may communicate with other components of the computing device, such as the processor 1402. The removable storage 1420 may be embodied in various memory card formats including, but not limited to, PC card, CompactFlash card, memory stick, secure digital ("SD"), miniSD, microSD, universal integrated circuit card ("UICC") (e.g., a subscriber identity module ("SIM") or universal SIM ("USIM")), a proprietary format, or the like.

It may be understood that one or more of the memory components 1404 may store an operating system. According to various configurations, the operating system includes, but is not limited to, SYMBIAN OS from SYMBIAN LIMITED, WINDOWS MOBILE OS from Microsoft Corporation of Redmond, Wash., WINDOWS PHONE OS from Microsoft Corporation, WINDOWS from Microsoft Corporation, PALM WEBOS from Hewlett-Packard Company of Palo Alto, Calif., BLACKBERRY OS from Research In Motion Limited of Waterloo, Ontario, Canada, IOS from Apple Inc. of Cupertino, Calif., and ANDROID OS from Google Inc. of Mountain View, Calif. Other operating systems are also contemplated.

The network connectivity components 1406 include a wireless wide area network component ("WWAN component") 1422, a wireless local area network component ("WLAN component") 1424, and a wireless personal area network component ("WPAN component") 1426. The network connectivity components 1406 facilitate communications to and from the network 1427 or another network, which may be a WWAN, a WLAN, or a WPAN. Although only the network 1427 is illustrated, the network connectivity components 1406 may facilitate simultaneous communication with multiple networks, including the network 1427 of FIG. 14. For example, the network connectivity components 1406 may facilitate simultaneous communications with multiple networks via one or more of a WWAN, a WLAN, or a WPAN. In some examples, the network 1427 may correspond to all or part of network(s) 116, network 504, network 1226, and/or network 1304, as shown in FIGS. 1, 5, 12, and 13.

The network 1427 may be or may include a WWAN, such as a mobile telecommunications network utilizing one or more mobile telecommunications technologies to provide voice and/or data services to a computing device utilizing the computing device architecture 1400 via the WWAN component 1422. The mobile telecommunications technologies may include, but are not limited to, Global System for Mobile communications ("GSM"), Code Division Multiple Access ("CDMA") ONE, CDMA2000, Universal Mobile Telecommunications System ("UMTS"), Long Term Evolution ("LTE"), and Worldwide Interoperability for Microwave Access ("WiMAX"). Moreover, the network 1427 may utilize various channel access methods (which may or cannot be used by the aforementioned standards) including, but not limited to, Time Division Multiple Access ("TDMA"), Frequency Division Multiple Access ("FDMA"), CDMA, wideband CDMA ("W-CDMA"), Orthogonal Frequency Division Multiplexing ("OFDM"), Space Division Multiple Access ("SDMA"), and the like. Data communications may be provided using General Packet Radio Service ("GPRS"), Enhanced Data rates for Global Evolution ("EDGE"), the High-Speed Packet Access ("HSPA") protocol family including High-Speed Downlink Packet Access ("HSDPA"), Enhanced Uplink ("EUL") or otherwise termed High-Speed Uplink Packet Access ("HSUPA"), Evolved HSPA ("HSPA+"), LTE, and various other current and future wireless data access standards. The network 1427 may be configured to provide voice and/or data communications with any combination of the above technologies. The network 1427 may be configured to or adapted to provide voice and/or data communications in accordance with future generation technologies.

In some configurations, the WWAN component 1422 is configured to provide dual-multi-mode connectivity to the network 1427. For example, the WWAN component 1422 may be configured to provide connectivity to the network 1427, wherein the network 1427 provides service via GSM and UMTS technologies, or via some other combination of technologies. Alternatively, multiple WWAN components 1422 may be utilized to perform such functionality, and/or provide additional functionality to support other non-compatible technologies (i.e., incapable of being supported by a single WWAN component). The WWAN component 1422 may facilitate similar connectivity to multiple networks (e.g., a UMTS network and an LTE network).

The network 1427 may be a WLAN operating in accordance with one or more Institute of Electrical and Electronic Engineers ("IEEE") 802.15 standards, such as IEEE 802.15a, 802.15b, 802.15g, 802.15n, and/or future 802.15 standard (referred to herein collectively as WI-FI). Draft 802.15 standards are also contemplated. In some configurations, the WLAN is implemented utilizing one or more wireless WI-FI access points. In some configurations, one or more of the wireless WI-FI access points are another computing device with connectivity to a WWAN that are functioning as a WI-FI hotspot. The WLAN component 1424 is configured to connect to the network 1427 via the WI-FI access points. Such connections may be secured via various encryption technologies including, but not limited, WI-FI Protected Access ("WPA"), WPA2, Wired Equivalent Privacy ("WEP"), and the like.

The network 1427 may be a WPAN operating in accordance with Infrared Data Association ("IrDA"), BLUETOOTH, wireless Universal Serial Bus ("USB"), Z-Wave, ZIGBEE, or some other short-range wireless technology. In some configurations, the WPAN component 1426 is configured to facilitate communications with other devices, such as peripherals, computers, or other computing entities via the WPAN.

In at least one example, the sensor components 1408 may include a magnetometer 1428, an ambient light sensor 1430, a proximity sensor 1432, an accelerometer 1434, a gyroscope 1436, and a Global Positioning System sensor ("GPS sensor") 1438. It is contemplated that other sensors, such as, but not limited to, temperature sensors or shock detection sensors, strain sensors, moisture sensors also may be incorporated in the computing device architecture 1400.

The magnetometer 1428 is configured to measure the strength and direction of a magnetic field. In some configurations the magnetometer 1428 provides measurements to a compass application program stored within one of the memory components 1404 in order to provide a user with accurate directions in a frame of reference including the cardinal directions, north, south, east, and west. Similar measurements may be provided to a navigation application program that includes a compass component. Other uses of measurements obtained by the magnetometer 1428 are contemplated.

The ambient light sensor 1430 is configured to measure ambient light. In some configurations, the ambient light sensor 1430 provides measurements to an application program stored within one the memory components 1404 in order to automatically adjust the brightness of a display (described below) to compensate for low-light and high-light environments. Other uses of measurements obtained by the ambient light sensor 1430 are contemplated.

The proximity sensor 1432 is configured to detect the presence of an object or thing in proximity to the computing device without direct contact. In some configurations, the proximity sensor 1432 detects the presence of a user's body (e.g., the user's face) and provides this information to an application program stored within one of the memory components 1404 that utilizes the proximity information to enable or disable some functionality of the computing device. For example, a telephone application program may automatically disable a touchscreen (described below) in response to receiving the proximity information so that the user's face does not inadvertently end a call or enable/disable other functionality within the telephone application program during the call. Other uses of proximity as detected by the proximity sensor 1428 are contemplated.

The accelerometer 1434 is configured to measure proper acceleration. In some configurations, output from the accelerometer 1434 is used by an application program as an input mechanism to control some functionality of the application program. For example, the application program may be a video game in which a character, a portion thereof, or an object is moved or otherwise manipulated in response to input received via the accelerometer 1434. In some configurations, output from the accelerometer 1434 is provided to an application program for use in switching between landscape and portrait modes, calculating coordinate acceleration, or detecting a fall. Other uses of the accelerometer 1434 are contemplated.

The gyroscope 1436 is configured to measure and maintain orientation. In some configurations, output from the gyroscope 1436 is used by an application program as an input mechanism to control some functionality of the application program. For example, the gyroscope 1436 may be used for accurate recognition of movement within a 3D environment of a video game application or some other application. In some configurations, an application program utilizes output from the gyroscope 1436 and the accelerometer 1434 to enhance control of some functionality of the application program. Other uses of the gyroscope 1436 are contemplated.

The GPS sensor 1438 is configured to receive signals from GPS satellites for use in calculating a location. The location calculated by the GPS sensor 1438 may be used by any application program that requires or benefits from location information. For example, the location calculated by the GPS sensor 1438 may be used with a navigation application program to provide directions from the location to a destination or directions from the destination to the location. Moreover, the GPS sensor 1438 may be used to provide location information to an external location-based service, such as E1515 service. The GPS sensor 1438 may obtain location information generated via WI-FI, WIMAX, and/or cellular triangulation techniques utilizing one or more of the network connectivity components 1406 to aid the GPS sensor 1438 in obtaining a location fix. The GPS sensor 1438 may also be used in Assisted GPS ("A-GPS") systems.

In at least one example, the I/O components 1410 may correspond to the input/output devices 540, described above with reference to FIG. 12. Additionally, and/or alternatively, the I/O components may include a display 1440, a touchscreen 1442, a data I/O interface component ("data I/O") 1444, an audio I/O interface component ("audio I/O") 1446, a video I/O interface component ("video I/O") 1448, and a camera 1450. In some configurations, the display 1440 and the touchscreen 1442 are combined. In some configurations two or more of the data I/O component 1444, the audio I/O component 1446, and the video I/O component 1448 are combined. The I/O components 1410 may include discrete processors configured to support the various interface described below, or may include processing functionality built-in to the processor 1402.

The display 1440 is an output device configured to present information in a visual form. In particular, the display 1440 may present graphical user interface ("GUI") elements, text, images, video, notifications, virtual buttons, virtual keyboards, messaging data, Internet content, device status, time, date, calendar data, preferences, map information, location information, and any other information that is capable of being presented in a visual form. In some configurations, the display 1440 is a liquid crystal display ("LCD") utilizing any active or passive matrix technology and any backlighting technology (if used). In some configurations, the display 1440 is an organic light emitting diode ("OLED") display. In some configurations, the display 1440 is a holographic display. Other display types are contemplated.

In at least one example, the display 1440 may correspond to a hardware display surface of the computing device 112 and/or the electronic device 506. As described above, the hardware display surface may be configured to graphically associate holographic user interfaces and other graphical elements with an object seen through the hardware display surface or rendered objects displayed on the hardware display surface.

The touchscreen 1442, also referred to herein as a "touch-enabled screen," is an input device configured to detect the presence and location of a touch. The touchscreen 1442 may be a resistive touchscreen, a capacitive touchscreen, a surface acoustic wave touchscreen, an infrared touchscreen, an optical imaging touchscreen, a dispersive signal touchscreen, an acoustic pulse recognition touchscreen, or may utilize any other touchscreen technology. In some configurations, the touchscreen 1442 is incorporated on top of the display 1440 as a transparent layer to enable a user to use one or more touches to interact with objects or other information presented on the display 1440. In other configurations, the touchscreen 1442 is a touch pad incorporated on a surface of the computing device that does not include the display 1440. For example, the computing device may have a touchscreen incorporated on top of the display 1440 and a touch pad on a surface opposite the display 1440.

In some configurations, the touchscreen 1442 is a single-touch touchscreen. In other configurations, the touchscreen 1442 is a multi-touch touchscreen. In some configurations, the touchscreen 1442 is configured to detect discrete touches, single touch gestures, and/or multi-touch gestures. These are collectively referred to herein as gestures for convenience. Several gestures will now be described. It should be understood that these gestures are illustrative and are not intended to limit the scope of the appended claims. Moreover, the described gestures, additional gestures, and/or alternative gestures may be implemented in software for use with the touchscreen 1442. As such, a developer may create gestures that are specific to a particular application program.

In some configurations, the touchscreen 1442 supports a tap gesture in which a user taps the touchscreen 1442 once on an item presented on the display 1440. The tap gesture may be used to perform various functions including, but not limited to, opening or launching whatever the user taps. In some configurations, the touchscreen 1442 supports a double tap gesture in which a user taps the touchscreen 1442 twice on an item presented on the display 1440. The double tap gesture may be used to perform various functions including, but not limited to, zooming in or zooming out in stages. In some configurations, the touchscreen 1442 supports a tap and hold gesture in which a user taps the touchscreen 1442 and maintains contact for at least a predefined time. The tap and hold gesture may be used to perform various functions including, but not limited to, opening a context-specific menu.

In some configurations, the touchscreen 1442 supports a pan gesture in which a user places a finger on the touchscreen 1442 and maintains contact with the touchscreen 1442 while moving the finger on the touchscreen 1442. The pan gesture may be used to perform various functions including, but not limited to, moving through screens, images, or menus at a controlled rate. Multiple finger pan gestures are also contemplated. In some configurations, the touchscreen 1442 supports a flick gesture in which a user swipes a finger in the direction the user wants the screen to move. The flick gesture may be used to perform various functions including, but not limited to, scrolling horizontally or vertically through menus or pages. In some configurations, the touchscreen 1442 supports a pinch and stretch gesture in which a user makes a pinching motion with two fingers (e.g., thumb and forefinger) on the touchscreen 1442 or moves the two fingers apart. The pinch and stretch gesture may be used to perform various functions including, but not limited to, zooming gradually in or out of a website, map, or picture.

Although the above gestures have been described with reference to the use of one or more fingers for performing the gestures, other appendages such as toes or objects such as styluses may be used to interact with the touchscreen 1442. As such, the above gestures should be understood as being illustrative and should not be construed as being limited in any way.

The data I/O interface component 1444 is configured to facilitate input of data to the computing device and output of data from the computing device. In some configurations, the data I/O interface component 1444 includes a connector configured to provide wired connectivity between the computing device and a computer system, for example, for synchronization operation purposes. The connector may be a proprietary connector or a standardized connector such as USB, micro-USB, mini-USB, or the like. In some configurations, the connector is a dock connector for docking the computing device with another device such as a docking station, audio device (e.g., a digital music player), or video device.

The audio I/O interface component 1446 is configured to provide audio input and/or output capabilities to the computing device. In some configurations, the audio I/O interface component 1446 includes a microphone configured to collect audio signals. In some configurations, the audio I/O interface component 1446 includes a headphone jack configured to provide connectivity for headphones or other external speakers. In some configurations, the audio I/O interface component 1446 includes a speaker for the output of audio signals. In some configurations, the audio I/O interface component 1446 includes an optical audio cable out.

The video I/O interface component 1448 is configured to provide video input and/or output capabilities to the computing device. In some configurations, the video I/O interface component 1448 includes a video connector configured to receive video as input from another device (e.g., a video media player such as a DVD or BLURAY player) or send video as output to another device (e.g., a monitor, a television, or some other external display). In some configurations, the video I/O interface component 1448 includes a High-Definition Multimedia Interface ("HDMI"), mini-HDMI, micro-HDMI, DisplayPort, or proprietary connector to input/output video content. In some configurations, the video I/O interface component 1448 or portions thereof is combined with the audio I/O interface component 1446 or portions thereof.

The camera 1450 may be configured to capture still images and/or video. The camera 1450 may utilize a charge coupled device ("CCD") or a complementary metal oxide semiconductor ("CMOS") image sensor to capture images. In some configurations, the camera 1450 includes a flash to aid in taking pictures in low-light environments. Settings for the camera 1450 may be implemented as hardware or software buttons. Images and/or video captured by camera 1450 may additionally or alternatively be used to detect non-touch gestures, facial expressions, eye movement, or other movements and/or characteristics of the user.

Although not illustrated, one or more hardware buttons may also be included in the computing device architecture 1400. The hardware buttons may be used for controlling some operational aspect of the computing device. The hardware buttons may be dedicated buttons or multi-use buttons. The hardware buttons may be mechanical or sensor-based.

The illustrated power components 1412 include one or more batteries 1452, which may be connected to a battery gauge 1454. The batteries 1452 may be rechargeable or disposable. Rechargeable battery types include, but are not limited to, lithium polymer, lithium ion, nickel cadmium, and nickel metal hydride. Each of the batteries 1452 may be made of one or more cells.

The battery gauge 1454 may be configured to measure battery parameters such as current, voltage, and temperature. In some configurations, the battery gauge 1454 is configured to measure the effect of a battery's discharge rate, temperature, age and other factors to predict remaining life within a certain percentage of error. In some configurations, the battery gauge 1454 provides measurements to an application program that is configured to utilize the measurements to present useful power management data to a user. Power management data may include one or more of a percentage of battery used, a percentage of battery remaining, a battery condition, a remaining time, a remaining capacity (e.g., in watt hours), a current draw, and a voltage.

The power components 1412 may also include a power connector, which may be combined with one or more of the aforementioned I/O components 1410. The power components 1412 may interface with an external power system or charging equipment via a power I/O component.

Example Clauses

The disclosure presented herein can be considered in view of the following clauses.

A. In some examples, a computing device comprises: one or more processors; and one or more computer-readable storage media storing instructions that are executable by the one or more processors to perform operations comprising: obtaining a first image of an eye of an individual; determining a gaze path of the individual based at least partly on the first image; obtaining a second image of at least a portion of a scene, wherein the scene includes one or more objects; determining a position of an object included in the scene based at least partly on the second image; determining that the object is within the gaze path of the individual based at least partly on the position of the object; receiving input to identify the object; sending communications to computing devices of a group of individuals, the communications including a request to identify the object; receiving a response from a computing device of a member of the group, the response including an identifier of the object; and providing output including the identifier of the object.

B. The computing device of clause A, wherein the computing device is in communication with a data store storing a database of object information, the database of object information including identifiers, categories, and characteristics related to a plurality of objects.

C. The computing device of clause B, wherein: the operations further comprise: determining a plurality of characteristics of the object; performing a comparison of the plurality of characteristics of the object with characteristics of at least a portion of the plurality of objects included in the database of object information; and determining, based at least partly on the comparison, that the object is absent from the database of object information; and the communications are sent to the computing devices of the group of individuals based at least partly on determining that the object is absent from the database of object information.

D. The computing device of any one of clauses A-C, wherein the operations further comprise selecting the group from a plurality of groups of individuals, wherein individual groups of the plurality of groups are associated with a set of object characteristics, a category of objects, or both.

E. The computing device of clause D, wherein the operations further comprise: performing a comparison of the plurality of characteristics with additional characteristics of a set of object characteristics associated with the group; determining, based on the comparison, a similarity score for the object and the group; determining that the similarity score is above a threshold score; and wherein selecting the group from the plurality of groups is based at least partly on the similarity score being above the threshold score.

Clause F. The computing device of any one of clause A-E, wherein: the response is one of a plurality of responses received from the computing devices of the group; the operations further comprise: determining a plurality of identifiers of the object included in the plurality of responses; determining a number of responses associated with each identifier of the plurality of identifiers; and determining a ranking of the plurality of responses based at least partly on the number of responses for each identifier; and providing the output including the identifier of the object is based at least partly on the ranking.

Clause G. The computing device of any one of clauses A-F, wherein the operations further comprise: determining a plurality of characteristics of the object; determining a category of the object based at least partly on the plurality of characteristics of the object; and adding the object to the database of object information by storing the plurality of characteristics of the object in the database of object information, and wherein the object is associated with the category in the database of object information.

Clause H. In some examples, a computing system comprises: one or more processors; one or more computer-readable storage media storing instructions that are executable by the one or more processors to perform operations comprising: determining a gaze path of an individual; determining a position of an object included in a scene; determining that the object is within the gaze path of the individual based at least partly on the position of the object; receiving input data including at least one of audible input, visual input, or sensor input; determining that the input data corresponds to a request to identify the object; receiving an identifier of the object from an additional computing device of an additional individual; and generating output data including the identifier of the object.

Clause I. The computing system of clause H, further comprising: a first camera to capture first images of an individual; and a second camera to capture second images of the scene; and wherein: the gaze of the individual is determined based at least partly on at least a portion of the first images; and the position of the object included in the scene is determined based at least partly on at least a portion of the second images.

Clause J. The computing system of clause I, wherein: the first images and the second images are captured by an electronic device; the operations further comprise: sending the first images to a server computing device that is located remotely from the electronic device; and sending the second images to the server computing device; and determining the gaze path of the individual is based at least partly on first information received from the server computing device indicating the gaze path of the individual; and determining the position of an object included in a scene is based at least partly on second information received from the server computing device indicating the position of the object.

Clause K. The computing system of any one of clauses H-J, wherein the operations further comprise: determining characteristics of the object based at least partly on images of the scene, the characteristics of the object including at least one of a shape of the object, contours of the object, at least one color of the object, at least one dimension of the object, a use of the object, or components of the object; determining characteristics of the scene based at least partly on the images of the scene; and determining a context of the object based at least partly on the characteristics of the scene, the context including a location of the object, at least one additional object in the location, or both.

Clause L. The computing system of clause K, further comprising: a data store storing a database of object information, the database of object information including contexts for objects and characteristics of the objects; wherein the operations further comprise: performing a first comparison between the characteristics of the object with the characteristics of the objects stored in the database of object information; performing a second comparison between the context of the object and the contexts for the objects stored in the database of object information; and determining that the object is absent from the database of object information based at least partly on the first comparison and the second comparison.

Clause M. The computing system of clause K, wherein the operations further comprise: selecting a group of individuals from among a plurality of groups of individuals based at least partly on the characteristics of the object and the context of the object; and sending communications to computing devices of the group, the communications including at least one of an image of the object, the characteristics of the object, or the context of the object; and wherein the additional individual is included in the group.

Clause N. The computing system of any one of clauses H-M, further comprising: determining that additional input data received by the computing system indicates that the input data corresponded to identifying a different object in the scene; projecting a visual indicator onto an additional object in the scene; determining that further input data corresponds to an additional request to identify the additional object; receiving an additional identifier of the additional object; and generating additional output data including the additional identifier of the additional object.

Clause O. The computing system of any one of clauses H-N, wherein determining that the input data corresponds to the request to identify the object includes at least one of: analyzing the audible input to identify sounds, words, or both that correspond with predetermined sounds, predetermined word, or both that are associated with requests to identify objects; analyzing the visual input to identify a gesture that corresponds with predetermined gestures that are associated with requests to identify objects; or analyzing the sensor input to identify an electroencephalogram (EEG) pattern that corresponds with predetermined EEG patterns that are associated with requests to identify objects.

Clause P. The computing system of clause O, wherein the operations further comprise: determining a first similarity score between the visual data and the predetermined words, the predetermined sounds, or both; and determining that the one or more words, the one or more sounds, or both correspond with a predetermined word of the predetermined words, a predetermined sound of the predetermined sounds, or both based at least partly on the first similarity score being above a first threshold.

Clause Q. The computing system of clause O, wherein the operations further comprise: determining a second similarity score between the visual data and the predetermined gestures; and determining that the gesture of the visual data corresponds with a predetermined gesture of the predetermined gestures based at least partly on the second similarity score being above a second threshold.

Clause R. The computing system of clause O, wherein the operations further comprise: determining a third similarity score between the sensor data and the predetermined EEG patterns; and determining that the EEG pattern of the sensor data corresponds with a predetermined EEG pattern of the predetermined EEG patterns based at least partly on the third similarity score being above a third threshold.

Clause S. The computing system of any one of clauses H-R, wherein the computing system includes a first computing device including a wearable computing device located at a first location, and a second computing device including a server located at a second location that is remote from the first location of the wearable computing device.

Clause T. The computing system of any one of clause H-S, wherein the output data includes at least one of audible output presented by a speaker of an electronic device or visual output displayed on a display device or projected into the scene.

Clause U. The computing system of any one of clauses H-T, wherein: the scene is generated by a computing device; and the scene is displayed via a display device of, or in communication with, the computing device.

Clause V. The computing system of any one of clauses H-U, wherein at least a portion of the features of the scene are projected into the scene by a computing device.

Clause W. The computing system of any one of clauses H-V, wherein the scene is a real-world scene and the object is a tangible, physical object included in the real-world scene.

Clause X. In some examples, a computer-implemented method comprises: receiving, by a computing device including a processor and memory and from an additional computing device, information related to a request to identify an object; determining, by the computing device, that the object is absent from a database of object information; identifying, by the computing device, a group of individuals from among a plurality of groups of individuals; sending, by the computing device, communications to computing devices of the group, the communications including a request to identify the object and an image of the object; receiving, by the computing device, responses from at least a portion of the computing devices of the group, the responses including a plurality of identifiers of the object; selecting, by the computing device, an identifier from among the plurality of the identifiers based at least partly on a number of occurrences of the identifier in the responses; and providing, by the computing device to the additional computing device, additional information including the identifier of the object.

Clause Y. The computer-implemented method of clause X, further comprising: determining that the object is within a gaze path of an individual based at least partly on an image of a scene that includes the object; identifying one or more features of the scene that are different from the object; and removing the one or more features from the image to produce a modified image that includes the object; wherein the communications sent to the computing devices of the group include the modified image.

Clause Z. The computer-implemented method of any one of clauses X and Y, wherein the one or more features are removed from the image according to a privacy filter to remove at least one of personal information or inappropriate information from images.

Clause AA. The computer-implemented method of any one of clauses X-Z, further comprising: determining at least one characteristic of the object based at least partly on one or more images of the object; determining a category of the object based at least partly on the at least one characteristic of the object; and determining that the category of the object corresponds with an additional category associated with the group, wherein the group is selected based at least partly on the category of the object corresponding with the additional category associated with the group.

Clause BB. The computer-implemented method of any one of clauses X-AA, wherein determining that the object is absent from the database of object information includes: comparing features of an image of the object with features of images of a plurality of objects included in the database of object information; determining similarity scores for the image and individual objects of the plurality of objects included in the database of object information; and determining each of the similarity scores is below a threshold.

Although various embodiments of the method and apparatus of the present invention have been illustrated herein in the Drawings and described in the Detailed Description, it will be understood that the invention is not limited to the embodiments disclosed, but is capable of numerous rearrangements, modifications and substitutions without departing from the scope of the present disclosure.

What is claimed is:

1. A computing device comprising:
   one or more processors; and
   one or more computer-readable storage media storing instructions that are executable by the one or more processors to perform operations comprising:
   obtaining a first image of an eye of an individual;
   determining a gaze path of the individual based at least partly on the first image;
   obtaining a second image of at least a portion of a scene, wherein the scene includes one or more objects;
   determining a position of an object included in the scene based at least partly on the second image;
   determining that the object is within the gaze path of the individual based at least partly on the position of the object;
   receiving input to identify the object;
   determining a plurality of characteristics of the object;
   selecting a group of individuals from a plurality of groups of individuals, wherein the group of individuals is known to be associated with a set of object characteristics that correspond, at least in part, to the plurality of characteristics of the object;
   sending communications to computing devices of the group of individuals, the communications including a request to identify the object;
   receiving a response from a computing device of a member of the group, the response including an identifier of the object; and
   providing output including the identifier of the object.

2. The computing device of claim 1, wherein the computing device is in communication with a data store storing a database of object information, the database of object information including identifiers, categories, and characteristics related to a plurality of objects.

3. The computing device of claim 2, wherein:

the operations further comprise:

performing a comparison of the plurality of characteristics of the object with characteristics of at least a portion of the plurality of objects included in the database of object information; and determining, based at least partly on the comparison, that the object is absent from the database of object information, wherein the communications are sent to the computing devices of the group of individuals based at least partly on determining that the object is absent from the database of object information.

4. The computing device of claim 1, wherein the group of individuals is known to be associated with a category of objects.

5. The computing device of claim 4, wherein the operations further comprise:

performing a comparison of the plurality of characteristics with the set of object characteristics associated with the group;

determining, based on the comparison, a similarity score for the object and the group;

determining that the similarity score is above a threshold score; and wherein selecting the group from the plurality of groups is based at least partly on the similarity score being above the threshold score.

6. The computing device of claim 1, wherein:

the response is one of a plurality of responses received from the computing devices of the group;

the operations further comprise:

determining a plurality of identifiers of the object included in the plurality of responses;

determining a number of responses associated with each identifier of the plurality of identifiers; and determining a ranking of the plurality of responses based at least partly on the number of responses for each identifier; and providing the output including the identifier of the object is based at least partly on the ranking.

7. The computing device of claim 1, wherein the operations further comprise:

determining a category of the object based at least partly on the plurality of characteristics of the object; and adding the object to a database of object information by storing the plurality of characteristics of the object in the database of object information, and wherein the object is associated with the category in the database of object information.

8. A computing system comprising:

one or more processors;

one or more computer-readable storage media storing instructions that are executable by the one or more processors to perform operations comprising:

determining a gaze path of an individual;

determining a position of an object included in a scene;

determining that the object is within the gaze path of the individual based at least partly on the position of the object;

receiving input data including at least one of audible input, visual input, or sensor input;

determining that the input data corresponds to a request to identify the object;

determining an identifier of the object;

generating output data including the identifier of the object;

determining that additional input data received indicates that the input data corresponded to identifying a different object in the scene;

projecting a visual indicator onto an additional object in the scene;

determining that further input data corresponds to an additional request to identify the additional object;

determining an additional identifier of the additional object; and generating additional output data including the additional identifier of the additional object.

9. The computing system of claim 8, further comprising:

a first camera to capture first images of an individual; and a second camera to capture second images of the scene; and wherein:

the gaze path of the individual is determined based at least partly on at least a portion of the first images; and the position of the object included in the scene is determined based at least partly on at least a portion of the second images.

10. The computing system of claim 9, wherein:

the first images and the second images are captured by an electronic device;

the operations further comprise:

sending the first images to a server computing device that is located remotely from the electronic device; and sending the second images to the server computing device; and determining the gaze path of the individual is based at least partly on first information received from the server computing device indicating the gaze path of the individual; and determining the position of the object included in the scene is based at least partly on second information received from the server computing device indicating the position of the object.

11. The computing system of claim 8, wherein the operations further comprise:

determining characteristics of the additional object based at least partly on images of the scene, the characteristics of the additional object including at least one of a shape of the additional object, contours of the additional object, at least one color of the additional object, at least one dimension of the additional object, a use of the additional object, or components of the additional object;

determining characteristics of the scene based at least partly on the images of the scene; and determining a context of the additional object based at least partly on the characteristics of the scene, the context including a location of the additional object.

12. The computing system of claim 11, further comprising:

a data store storing a database of object information, the database of object information including contexts for objects and characteristics of the objects;

wherein the operations further comprise:

performing a first comparison between the characteristics of the additional object with the characteristics of the objects stored in the database of object information;

performing a second comparison between the context of the additional object and the contexts for the objects stored in the database of object information; and determining that the additional object is absent from the database of object information based at least partly on the first comparison and the second comparison.

13. The computing system of claim 11, wherein the operations further comprise:

selecting a group of individuals from among a plurality of groups of individuals based at least partly on the characteristics of the additional object and the context of the additional object; and sending communications to computing devices of the group, the communications including at least one of an image of the additional object, the characteristics of the additional object, or the context of the additional object.

14. The computing system of claim 8, wherein determining that the input data corresponds to the request to identify the object includes at least one of:

analyzing the audible input to identify sounds, words, or both that correspond with predetermined sounds, predetermined words, or both that are associated with requests to identify objects;

analyzing the visual input to identify a gesture that corresponds with predetermined gestures that are associated with requests to identify objects; or analyzing the sensor input to identify an electroencephalogram (EEG) pattern that corresponds with predetermined EEG patterns that are associated with requests to identify objects.

15. A method comprising:

obtaining a first image of an eye of an individual;

determining, by one or more processors, a gaze path of the individual based at least partly on the first image;

obtaining a second image of at least a portion of a scene, wherein the scene includes one or more objects;

determining a position of an object included in the scene based at least partly on the second image;

determining that the object is within the gaze path of the individual based at least partly on the position of the object;

receiving input to identify the object;

determining a plurality of characteristics of the object;

selecting a group of individuals from a plurality of groups of individuals, wherein the group of individuals is known to be associated with a set of object characteristics that correspond, at least in part, to the plurality of characteristics of the object;

sending communications to computing devices of the group of individuals, the communications including a request to identify the object;

receiving a response from a computing device of a member of the group, the response including an identifier of the object; and providing output including the identifier of the object.

16. The method of claim 15, further comprising communicating with a data store storing a database of object information, the database of object information including identifiers, categories, and characteristics related to a plurality of objects.

17. The method of claim 16, further comprising:

performing a comparison of the plurality of characteristics of the object with characteristics of at least a portion of the plurality of objects included in the database of object information; and determining, based at least partly on the comparison, that the object is absent from the database of object information, wherein the communications are sent to the computing devices of the group of individuals based at least partly on determining that the object is absent from the database of object information.

18. The method of claim 15, wherein the group is known to be associated with a category of objects.

19. The method of claim 18, further comprising:

performing a comparison of the plurality of characteristics with the set of object characteristics associated with the group;

determining, based on the comparison, a similarity score for the object and the group;

determining that the similarity score is above a threshold score; and wherein selecting the group from the plurality of groups is based at least partly on the similarity score being above the threshold score.

* * * * *